(12) United States Patent
Miyagi et al.

(10) Patent No.: US 8,223,401 B2
(45) Date of Patent: Jul. 17, 2012

(54) IMAGE PROCESSING APPARATUS, IMAGE PROCESSING SYSTEM, AND IMAGE PROCESSING METHOD

(75) Inventors: Noriko Miyagi, Kanagawa (JP); Satoshi Ouchi, Tokyo (JP); Hiroyuki Shibaki, Tokyo (JP); Yuki Matsushima, Kanagawa (JP); Hirokazu Takenaka, Kanagawa (JP); Atsushi Togami, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 828 days.

(21) Appl. No.: 12/314,124

(22) Filed: Dec. 4, 2008

(65) Prior Publication Data
US 2009/0147313 A1 Jun. 11, 2009

(30) Foreign Application Priority Data

Dec. 5, 2007 (JP) ................................. 2007-315088
Mar. 28, 2008 (JP) ................................. 2008-086966

(51) Int. Cl.
*H04N 1/40* (2006.01)
(52) U.S. Cl. ......................................... 358/2.1; 358/504
(58) Field of Classification Search .................. 358/1.9, 358/2.1, 400, 406, 500, 504, 527, 468
See application file for complete search history.

(56) References Cited

U.S. PATENT DOCUMENTS

| | | | |
|---|---|---|---|
| 5,751,433 A | 5/1998 | Narendranath et al. |
| 5,860,047 A | 1/1999 | Hernandez |
| 7,298,522 B2 | 11/2007 | Sugimoto |
| 7,327,874 B2 | 2/2008 | Shibaki et al. |
| 7,356,160 B2 | 4/2008 | Shibaki et al. |
| 7,403,310 B2 | 7/2008 | Miyagi et al. |
| 2003/0047099 A1 | 3/2003 | Hanyu |
| 2003/0058465 A1 | 3/2003 | Miyagi et al. |
| 2003/0067636 A1 | 4/2003 | Kanno et al. |
| 2004/0165081 A1 | 8/2004 | Shibaki et al. |
| 2004/0184097 A1 | 9/2004 | Suzuki |
| 2004/0252316 A1 | 12/2004 | Miyagi et al. |
| 2004/0257622 A1 | 12/2004 | Shibaki et al. |
| 2005/0018258 A1 | 1/2005 | Miyagi et al. |
| 2005/0018903 A1 | 1/2005 | Miyagi et al. |
| 2005/0207661 A1 | 9/2005 | Miyagi et al. |
| 2006/0187246 A1 | 8/2006 | Miyagi |
| 2006/0256123 A1 | 11/2006 | Miyagi |
| 2006/0274332 A1 | 12/2006 | Miyagi |
| 2007/0206228 A1 | 9/2007 | Miyagi |
| 2008/0144975 A1 | 6/2008 | Shibaki et al. |

FOREIGN PATENT DOCUMENTS

| | | |
|---|---|---|
| JP | 07-314783 | 12/1995 |
| JP | 10-268705 | 10/1998 |
| JP | 2001-230924 | 8/2001 |
| JP | 3230598 | 9/2001 |
| JP | 2003-76097 | 3/2003 |

(Continued)

OTHER PUBLICATIONS

Abstract of JP 05-244319 published on Sep. 21, 1993.

(Continued)

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An information acquiring unit acquires information indicating whether a color material used at least for image formation is saved. An image-information generating unit creates, when the information acquiring unit acquires the information for saving the color material, image information using the color material of which consumption is saved.

12 Claims, 19 Drawing Sheets

FOREIGN PATENT DOCUMENTS

| | | |
|---|---|---|
| JP | 2004-160743 A | 6/2004 |
| JP | 2004-177884 A | 6/2004 |
| JP | 2004-249499 A | 9/2004 |
| JP | 2005-010679 A | 1/2005 |

OTHER PUBLICATIONS

Extended European Search Report with translation.
Office Action for corresponding Japanese patent application No. 2007-315088 dated Aug. 12, 2011.

IMAGE PROCESSING APPARATUS, IMAGE PROCESSING SYSTEM, AND IMAGE PROCESSING METHOD

CROSS-REFERENCE TO RELATED APPLICATIONS

The present application claims priority to and incorporates by reference the entire contents of Japanese priority document 2007-315088 filed in Japan on Dec. 5, 2007 and Japanese priority document 2008-086966 filed in Japan on Mar. 28, 2008.

BACKGROUND OF THE INVENTION

1. Field of the Invention

The present invention relates to an image processing apparatus, an image processing system, and an image processing method, and more particularly, to an image processing apparatus, an image processing system, and an image processing method for performing image processing to save color-material consumption.

2. Description of the Related Art

Conventionally, when a test output is generated for checking a layout of an output image in image forming apparatuses that form images using a color material such as toner or ink, many users do not much care about the quality of the output image. In this case, it is rather desirable to form an image under the condition of reducing color material usage to some extent and to save the color material usage. For example, if an image is an ordinary document image, even if the color material usage is reduced by about 10% to 20% with respect to the color material usage required to output an original document image by thinning dots, the reduction does not much affect readability of text in the output image. Moreover, even if an image contains graphics such as a figure and a graph, the reduction of the color material by about 10% to 20% rarely causes image degradation to such an extent that it becomes difficult to read.

Japanese Patent Application Laid-open No. H07-314783 discloses an image forming apparatus that forms an image under the condition of executing a color-material saving mode according to the necessity and of saving the color material more than that of a normal case. This configuration allows saving of the color material usage by executing the color-material saving mode according to user's requirements.

However, this configuration may give a false impression to a person viewing the output image that the image is handled by a low-performance device. Specifically, a method of saving the color material includes various methods such as a method of thinning dots using a dither method or the like, and a method of reducing a toner adhesion amount per dot using pulse width modulation and light amount control of writing. Even if any of the methods is used, the quality of the image, of which color material amount is reduced more than the original one by the method, decreases as compared with the original image. If a person does not recognize that the image is formed in the color-material saving mode and views the image, the low image quality may give the false impression as explained above to the person. For example, there is a case in offices in which an administrator having the right to change condition settings of the image forming apparatus sets the color-material saving mode but users other than the administrator perform image output without recognizing the setting.

Also in a case where a material output in the color-material saving mode is distributed to those who attend a conference, almost no attendees recognize that the distributed material is formed in the color-material saving mode. For example, when original image information is converted to image information for saving the color material and is transmitted by a facsimile machine, the quality of the image output from a facsimile machine in the receiver side becomes low. The receiver does not recognize that the output image is formed based on the image information converted to save the color material, and therefore, the receiver may misunderstand that the facsimile machine in the transmitter side is low in performance.

SUMMARY OF THE INVENTION

It is an object of the present invention to at least partially solve the problems in the conventional technology.

According to one aspect of the present invention, there is provided an image processing apparatus including an information acquiring unit that acquires information indicating whether a color material used at least for image formation is saved; and an image-information generating unit that creates, when the information acquiring unit acquires the information for saving the color material, image information using the color material of which consumption is saved.

Furthermore, according to another aspect of the present invention, there is provide an image processing system including a paper-information reading unit that reads information from dedicated output paper added with information for setting a mode of saving color-material consumption; a setting unit that sets an executable saving mode of the color-material consumption based on the saving mode of the color-material consumption specified by the user and also based on the information acquired from the output paper determined by the paper-information reading unit; and an image processing unit that performs image processing according to the saving mode of the color-material consumption set by the setting unit.

Moreover, according to still another aspect of the present invention, there is provided an image processing method including information acquiring including acquiring information indicating whether a color material used at least for image formation is saved; and image-information generating including creating, when the information for saving the color material is acquired at the information acquiring, image information using the color material of which consumption is saved.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a schematic of an example of a printout of a color-material saved image based on image information for color-material saving created by the image processing apparatus when the color-material saving mode is set to ON;

DETAILED DESCRIPTION OF THE PREFERRED EMBODIMENTS

Exemplary embodiments of the image processing apparatus, the image processing system, and the image processing method according to the present invention are explained in detail below with reference to the accompanying drawings. An image processing apparatus to which the present invention is applied will be explained below using a copy machine that forms an image in an electrophotographic method.

Figure 1:
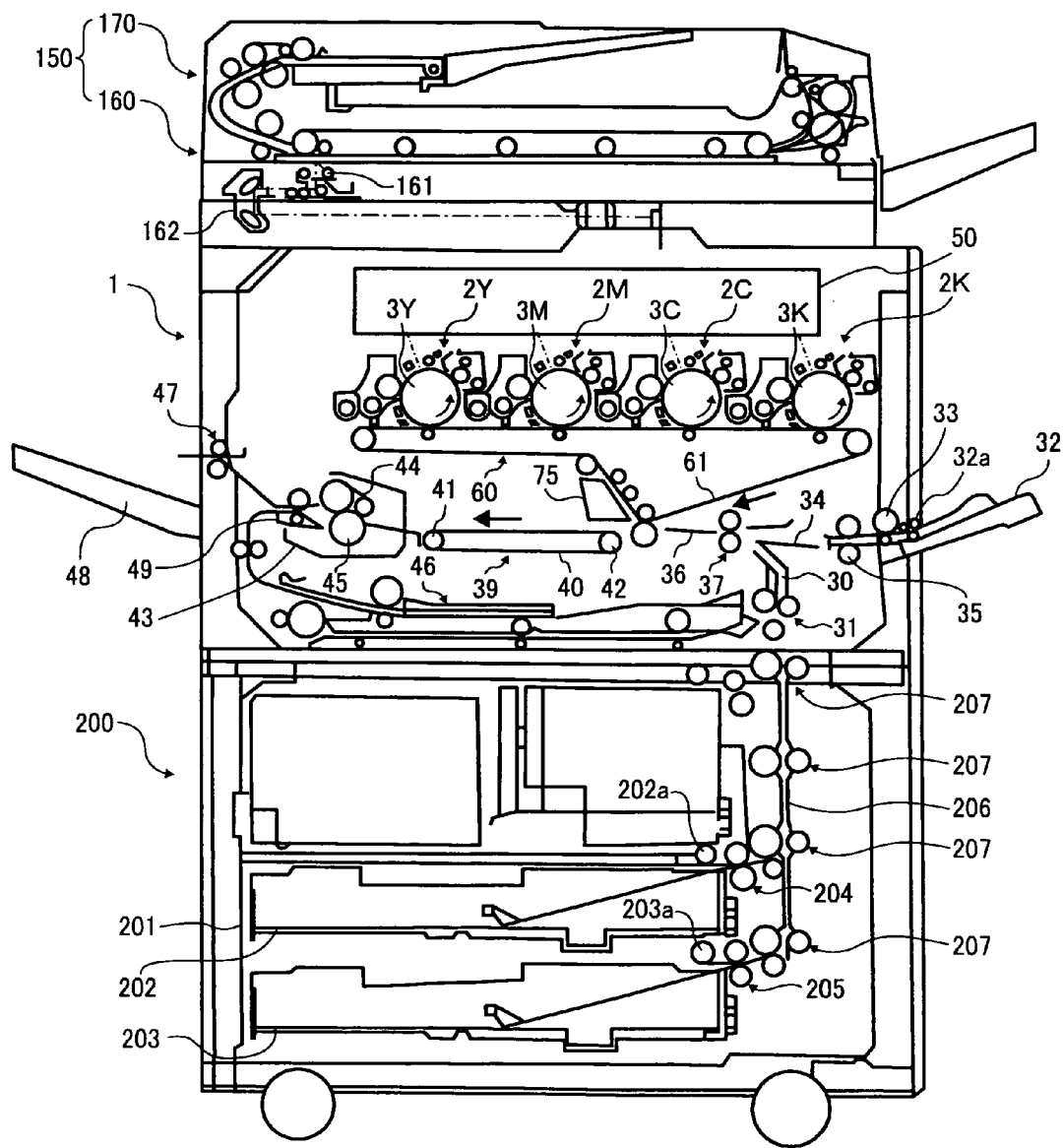
FIG. 1 is a schematic of a copy machine according to a first embodiment of the present invention.

FIG. 1 is a schematic of a copy machine according to a first embodiment of the present invention. The copy machine includes a printer unit 1 as an image forming unit, a paper feeding device 200, and an original feeding/reading unit 150.

The original feeding/reading unit 150 includes a scanner 160 being an original reader fixed on the printer unit 1, and an automatic document feeder (ADF) 170 being an original feeding device supported by the scanner 160.

The paper feeding device 200 includes two paper feeding cassettes 202 and 203 provided in a multistage in a paper bank 201, two separation roller pairs 204 and 205, a paper feeding path 206, and a plurality of conveying roller pairs 207. Each of the two paper feeding cassettes 202 and 203 stores paper sheets (not shown) as recording materials inside thereof in such a manner as a stack of superimposed paper sheets. The paper feeding device 200 causes a sending roller 202a or 202a to rotate and sends out a top sheet of the stack of paper sheets toward the paper feeding path 206. A sheet separated from send-out paper sheets by the separation roller pair 204 or 205 reaches inside the paper feeding path 206. The sheet is sent to a first reception-branch path 30 of the printer unit 1 through each conveying nip between the conveying roller pairs 207 arranged in the paper feeding path 206.

The printer unit 1 includes four process units 2Y, 2M, 2C, and 2K to form toner images of yellow (Y), magenta (M), cyan (C), and black (K) respectively. The printer unit 1 also includes the first reception-branch path 30, a reception-feed roller pair 31, a manual feed tray 32, a manually-fed-paper separation roller pair 33, a second reception-branch path 34, a manually-fed-paper conveying roller pair 35, a pre-transfer conveying path 36, a registration roller pair 37, a conveyor belt unit 39, a fixing unit 43, a switch-back device 46, a paper-discharging roller pair 47, a paper discharging tray 48, a switching claw 49, an optical writing unit 50, and a transfer unit 60. The process units 2Y, 2M, 2C, and 2K include drum-shaped photosensitive elements 3Y, 3M, 3C, and 3K being latent-image carriers, respectively.

The pre-transfer conveying path 36 for conveying a paper sheet is branched into the first reception-branch path 30 and the second reception-branch path 34 right in front of a secondary transfer nip, explained later, in the upstream in a paper conveying direction. The paper sheet fed from the paper feeding path 206 of the paper feeding device 200 is received by the first reception-branch path 30 and is sent to the pre-transfer conveying path 36 through the conveying nip between the reception-feed roller pair 31 provided in the first reception-branch path 30.

Provided on the side face of a housing of the printer unit 1 is the manual feed tray 32 so as to be openable and closable with respect to the housing, and the stack of paper sheets is manually put on the top of the tray when it is open with respect to the housing. The top sheet of the stack of the manually put paper sheets is sent to the second reception-branch path 34 by a sending roller 32a of the manual feed tray 32. A sheet separated from the paper sheets by the manually-fed-paper separation roller pair 33 is sent to the second reception-branch path 34, and then sent to the pre-transfer conveying path 36 through the conveying nip between the manually-fed-paper conveying roller pair 35 provided in the second reception-branch path 34.

The optical writing unit 50 includes a laser diode, a polygon mirror, and various lenses which are not shown. The optical writing unit 50 drives the laser diode based on image information read by the scanner 160 explained later or image information sent from an external personal computer, to optically scan the photosensitive elements 3Y, 3M, 3C, and 3K of the process units 2Y, 2M, 2C, and 2K, respectively. Specifically, the photosensitive elements 3Y, 3M, 3C, and 3K of the process units 2Y, 2M, 2C, and 2K are made to rotate in the counterclockwise in FIG. 1 by a drive unit (not shown). The optical writing unit 50 performs an optical scanning process by irradiating the rotating photosensitive elements 3Y, 3M, 3C, and 3K with laser beams L (FIG. 2) while polarizing them in a rotating axis direction respectively. Thus, electrostatic latent images are formed on the photosensitive elements 3Y, 3M, 3C, and 3K based on the Y, M, C, and K image information respectively.

Figure 2:
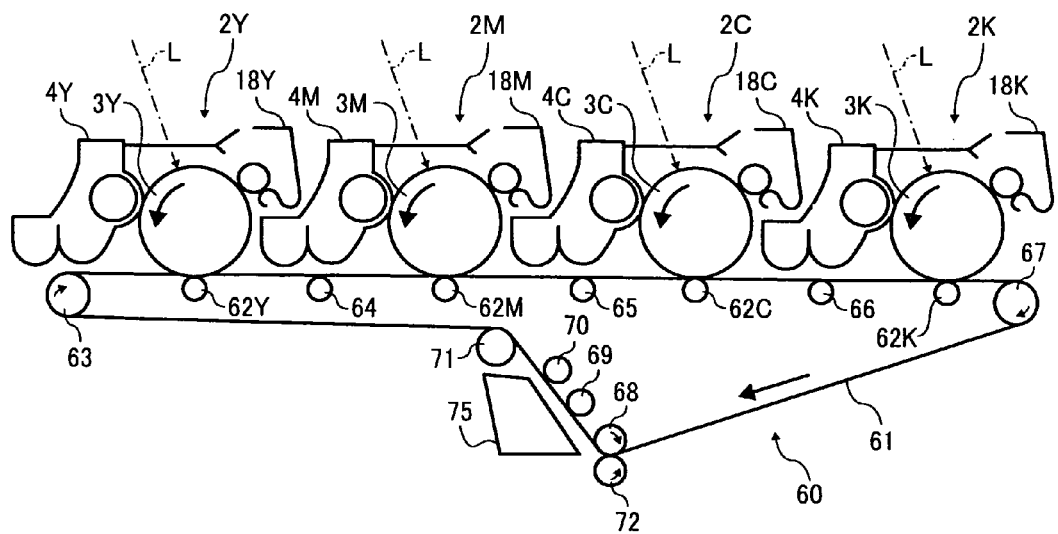
FIG. 2 is a partially enlarged schematic of a partially enlarged internal configuration of a printer unit.

FIG. 2 is a partially enlarged schematic of a partially enlarged internal configuration of the printer unit. Each of the process units 2Y, 2M, 2C, and 2K in the printer unit 1 includes a photosensitive element being a latent-image carrier and various devices arranged around the photosensitive element as one unit which is commonly supported by a support element. The unit is detachably attached to the main body of the printer unit 1. The units are identically configured except for different colors of the toner. The process unit 2Y for Y, as an example, includes the photosensitive element 3Y and a developing device 4Y that develops the electrostatic latent image formed on the surface thereof to a Y toner image. In addition to these, the process unit 2Y includes a drum cleaning device 18Y that cleans "residual toner after transfer" adhering to the surface of the photosensitive element 3Y after passing through a primary transfer nip for Y explained later. The copy machine according to the first embodiment is configured in a so-called "tandem" manner to align the four process units 2Y, 2M, 2C, and 2K along an intermediate transfer belt 61 explained later in its endless movement direction.

Figure 3:
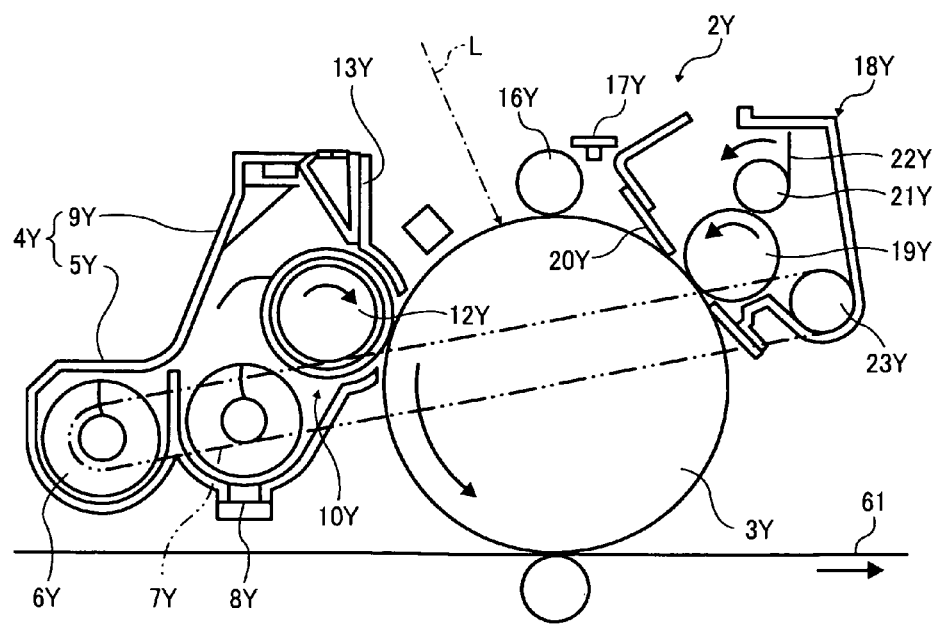
FIG. 3 is an enlarged schematic of a process unit for Y in the printer unit of FIG. 2.

FIG. 3 is an enlarged schematic of the process unit for Y in the printer unit of FIG. 2. The process unit 2Y includes the developing device 4Y, the drum cleaning device 18Y, a decharging lamp 17Y, and a charging roller 16Y which are arranged around the photosensitive element 3Y.

Used as the photosensitive element 3Y is a drum-shaped one with a photosensitive layer formed thereon by applying an organic photosensitive material having photosensitivity, to an element tube made of aluminum or the like. However, an endless belt-shaped one may also be used.

The developing device 4Y develops a latent image using a two-component developer (hereinafter, "developer") containing magnetic carrier and nonmagnetic Y toner (not shown). The developing device 4Y includes a stirring unit 5Y that conveys the developer contained inside the device while stirring it, and a developing unit 9Y that develops the electrostatic latent image on the photosensitive element 3Y. As the developing device 4Y, any type that develops the image using a one-component developer not containing the magnetic carrier instead of the developer can be used.

The stirring unit 5Y is provided in a position lower than the developing unit 9Y, and includes a first conveyor screw 6Y and a second conveyor screw 7Y which are arranged in parallel to each other, a partition plate provided between the screws, and a toner concentration sensor 8Y provided in the bottom of a casing.

The developing unit 9Y includes a developing roller 10Y opposed to the photosensitive element 3Y through an opening of the casing, and a doctor blade 13Y whose edge is made close to the developing roller 10Y. The developing roller 10Y includes a cylindrical developing sleeve 11Y formed with a nonmagnetic material, and a magnet roller 12Y non-rotatably provided inside the developing roller 10Y. The magnet roller 12Y has a plurality of magnetic poles arranged in its circumferential direction. These magnetic poles cause magnetic force to act on the developer on the sleeve at predetermined positions in the rotational direction. Thus, the developer sent from the stirring unit 5Y is attracted to the surface of the developing sleeve 11Y to be carried thereon and a magnetic brush is formed along the line of magnetic force on the surface of the sleeve.

The magnetic brush is controlled to an appropriate layer thickness when the brush passes through an opposed position to the doctor blade 13Y following a rotation of the developing sleeve 11Y, and then is conveyed to a developing region opposed to the photosensitive element 3Y. The Y toner is transferred to the electrostatic latent image by a developing bias applied to the developing sleeve 11Y and a potential difference with the electrostatic latent image on the photosensitive element 3Y, so that development is performed. Furthermore, the Y toner returns again into the developing unit 9Y following a rotation of the developing sleeve 11Y, is separated from the surface of the sleeve due to effect of a repelling magnetic field formed between the magnetic poles of the magnet roller 12Y, and then is returned into the stirring unit 5Y. An appropriate amount of toner is supplied to the developer in the stirring unit 5Y based on the result of detection by the toner concentration sensor 8Y.

Used as the drum cleaning device 18Y is a system of pressing a polyurethane-rubber cleaning blade 20Y against the photosensitive element 3Y, however, any other system may be used. To enhance the cleaning performance, a system of providing a fur brush 19Y is employed in the copy machine. Specifically, the fur brush 19Y whose outer circumferential surface is brought into contact with the photosensitive element 3Y is provided so as to be rotatable in the arrow direction of FIG. 3. The fur brush 19Y plays also a role of scraping a lubricant from a solid lubricant (not shown) and powdering it to be applied to the surface of the photosensitive element 3Y.

The toner adhering to the fur brush 19Y is transferred to an electric-field roller 21Y which contacts the fur brush 19Y in the counter direction and to which bias is applied while rotating. After the toner scraped off from the electric-field roller 21Y by a scraper 22Y drops on a collecting screw 23Y.

The collecting screw 23Y conveys the collected toner toward an end portion in a direction perpendicular to the plane of the figure in the drum cleaning device 18Y, and transfers the toner to an external recycle conveying device. The recycle conveying device (not shown) sends the received toner to the developing device 4Y, and is recycled.

The decharging lamp 17Y decharges the photosensitive element 3Y by light irradiation. The decharged surface of the photosensitive element 3Y is uniformly charged by the charging roller 16Y, and then is optically scanned by the optical writing unit. It is noted that the charging roller 16Y is made to rotate while being supplied with charging bias from a power supply (not shown). Instead of a charging system using the charging roller 16Y, a scorotron charger system may be used. The scorotron charger system performs a charging process in a non-contact manner with respect to the photosensitive element 3Y.

Referring back to FIG. 2, Y, M, C, and K toner images are formed on the surfaces of the photosensitive elements 3Y, 3M, 3C, and 3K of the four process units 2Y, 2M, 2C, and 2K, respectively, by the processes explained so far.

The transfer unit 60 is provided below the four process units 2Y, 2M, 2C, and 2K. The transfer unit 60 endlessly moves an endlessly formed intermediate transfer belt 61, which is stretched and supported by a plurality of rollers 63 to 67 and 69 to 71, and some other rollers (explained later), by rotation of any one of the rollers in the clockwise in FIG. 2 while being in contact with the photosensitive elements 3Y, 3M, 3C, and 3K. Thus, primary transfer nips for Y, M, C, and K are formed between the photosensitive elements 3Y, 3M, 3C, and 3K and the intermediate transfer belt 61, respectively.

The intermediate transfer belt 61 is pushed toward the photosensitive elements 3Y, 3M, 3C, and 3K by primary transfer rollers 62Y, 62M, 62C, and 62K arranged inside a belt loop near the primary transfer nips for Y, M, C, and K, respectively. Primary transfer biases are applied to the primary transfer rollers 62Y, 62M, 62C, and 62K, respectively, by a power supply (not shown). Thus, primary-transfer electric fields are formed at the primary transfer nips for Y, M, C, and K so as to electrostatically move the toner images on the photosensitive elements 3Y, 3M, 3C, and 3K toward the intermediate transfer belt 61.

The intermediate transfer belt 61 sequentially passes through the primary transfer nips for Y, M, C, and K in association with the endless movement in the clockwise of FIG. 2, and the toner images are primarily transferred to the face of the intermediate transfer belt 61 at the primary transfer nips so as to be sequentially superimposed on each other. Four-color superimposed toner images (hereinafter, "four-color toner images") are formed on the face of the intermediate transfer belt 61 due to the primary transfer in the superimposed manner.

A secondary transfer roller 72 is provided in the lower part of the intermediate transfer belt 61 in FIG. 2. The secondary transfer nip is formed between the secondary transfer roller 72 and a secondary-transfer backup roller 68. Specifically, the secondary transfer roller 72 is in contact with the secondary-transfer backup roller 68 from the face of the intermediate transfer belt 61 at a location of the secondary-transfer backup roller 68 around which the intermediate transfer belt 61 is wound. Thus, the secondary transfer nip is formed at the location where the face of the intermediate transfer belt 61 and the secondary transfer roller 72 contact each other.

A secondary transfer bias is applied to the secondary transfer roller 72 by the power supply (not shown). Meanwhile, the secondary-transfer backup roller 68 inside the belt loop is grounded. Thus, a secondary-transfer electric field is formed in the secondary transfer nip.

The registration roller pair 37 (in FIG. 1) is provided on the right side in FIG. 2 of the secondary transfer nip. A sheet of paper held by the rollers is sent to the secondary transfer nip at a timing of synchronizing the sheet to the four-color toner images on the intermediate transfer belt 61. In the secondary transfer nip, the four-color toner images on the intermediate transfer belt 61 are secondarily transferred to the sheet collectively due to the effect of the secondary-transfer electric field and of a nip pressure, and become a full color image together with white of a recording paper.

The residual toner after transfer which is not transferred to the recording paper at the secondary transfer nip adheres to the face of the intermediate transfer belt 61 having passed through the secondary transfer nip. The residual toner after transfer is cleaned by a belt cleaning device 75 that comes in contact with the intermediate transfer belt 61.

Referring back to FIG. 1, the sheet having passed through the secondary transfer nip separates from the intermediate transfer belt 61, and is transferred to the conveyor belt unit 39. The conveyor belt unit 39 causes a endless conveyor belt 40 to endlessly move in the counterclockwise in FIG. 1 by rotation of a driving roller 41 while being stretched and supported by the driving roller 41 and a driven roller 42. The conveyor belt 40 conveys the sheet transferred from the secondary transfer nip while holding it on the upper stretch face of the belt, in association with the endless movement of the belt, and transfers the sheet to the fixing unit 43.

The fixing unit 43 endlessly moves a fixing belt 44 stretched and supported by a driving roller and a heating roller containing a heater, in the clockwise of FIG. 1 in association by rotation of the driving roller. A fixing nip is formed by causing a pressing roller 45 provided in the lower part of the fixing belt 44 to come in contact with the stretch face of the fixing belt 44 at its lower part. The sheet received by the fixing unit 43 is pressed and heated in the fixing unit, and the full color image is thereby fixed on the surface of the sheet. The sheet is sent out from the fixing unit 43 toward the switching claw 49.

The switching claw 49 is rotated by a solenoid (not shown), and a conveying path of the sheet is switched between a paper discharging path and a reversing path due to the rotation. When the paper discharging path is selected by the switching claw 49, the sheet sent from the fixing unit 43 is discharged to the outside of the machine after passing through the paper discharging path and the paper-discharging roller pair 47, and is stacked on the paper discharging tray 48.

The switch-back device 46 is provided below the fixing unit 43 and the conveyor belt unit 39. When a switch-back path is selected by the switching claw 49, the sheet output from the fixing unit 43 passes through the reversing path where the sheet is turned upside down, and is then sent to the switch-back device 46. The sheet again enters the secondary transfer nip, where a secondary transfer process and a fixing process of an image are subjected to the other side of the sheet.

The scanner 160 fixed on the printer unit 1 includes a fixed reader 161 and a moving reader 162 as reading units to read an image of an original (not shown). The fixed reader 161 includes a light source, a reflective mirror, and an image reading sensor such as a charge-coupled device (CCD), and is fixed right under a first contact glass (not shown) fixed to the upper wall of the casing of the scanner 160 so as to contact the original. When the original fed by the ADF 170 is passing through the first contact glass, the light emitted from the light source is sequentially reflected on the surface of the original to pass through a plurality of reflective mirrors, and is received by the image reading sensor. Thus, the original is scanned without moving an optical system including the light source and the reflective mirrors.

Meanwhile, the moving reader 162 is provided right under a second contact glass (not shown) fixed to the upper wall of the casing of the scanner 160 so as to contact the original, and enables an optical system including a light source and reflective mirrors to move in the horizontal direction of FIG. 1. During the process of moving the optical system from the left side to the right side of the figure, the light emitted from the light source is reflected by the original (not shown) set on the second contact glass, is passed through the reflective mirrors, and is received by the image reading sensor fixed to the main body of the scanner. Thus, the original is scanned while the optical system is moved.

The copy machine has a function as a copier that forms an image based on image information of an original read by the scanner 160 on a sheet of paper by the printer unit 1 and also functions as a printer and a facsimile machine. Specifically, the printer unit 1 includes a local area network (LAN) connector (not shown), and by connecting a LAN cable to the connector, the copy machine can perform communication with a personal computer (not shown). An image based on image information sent from the personal computer through the LAN cable and the LAN connector can be formed on the sheet by the printer unit 1 (printer function). Furthermore, the printer unit 1 also includes a modem (not shown), and by connecting a telephone line to the modem, an image based on image information transmitted through the telephone line can be output to a destination facsimile machine (facsimile function). At this time, the image information as the source of the image to be transmitted to a destination can be acquired by reading an original by the scanner 160 being an information acquiring unit. By receiving the image information sent from the personal computer through the LAN connector being the information acquiring unit, the image information being the source of the image to be transmitted can also be acquired.

A characteristic configuration of the copy machine will be explained below.

Figure 4:
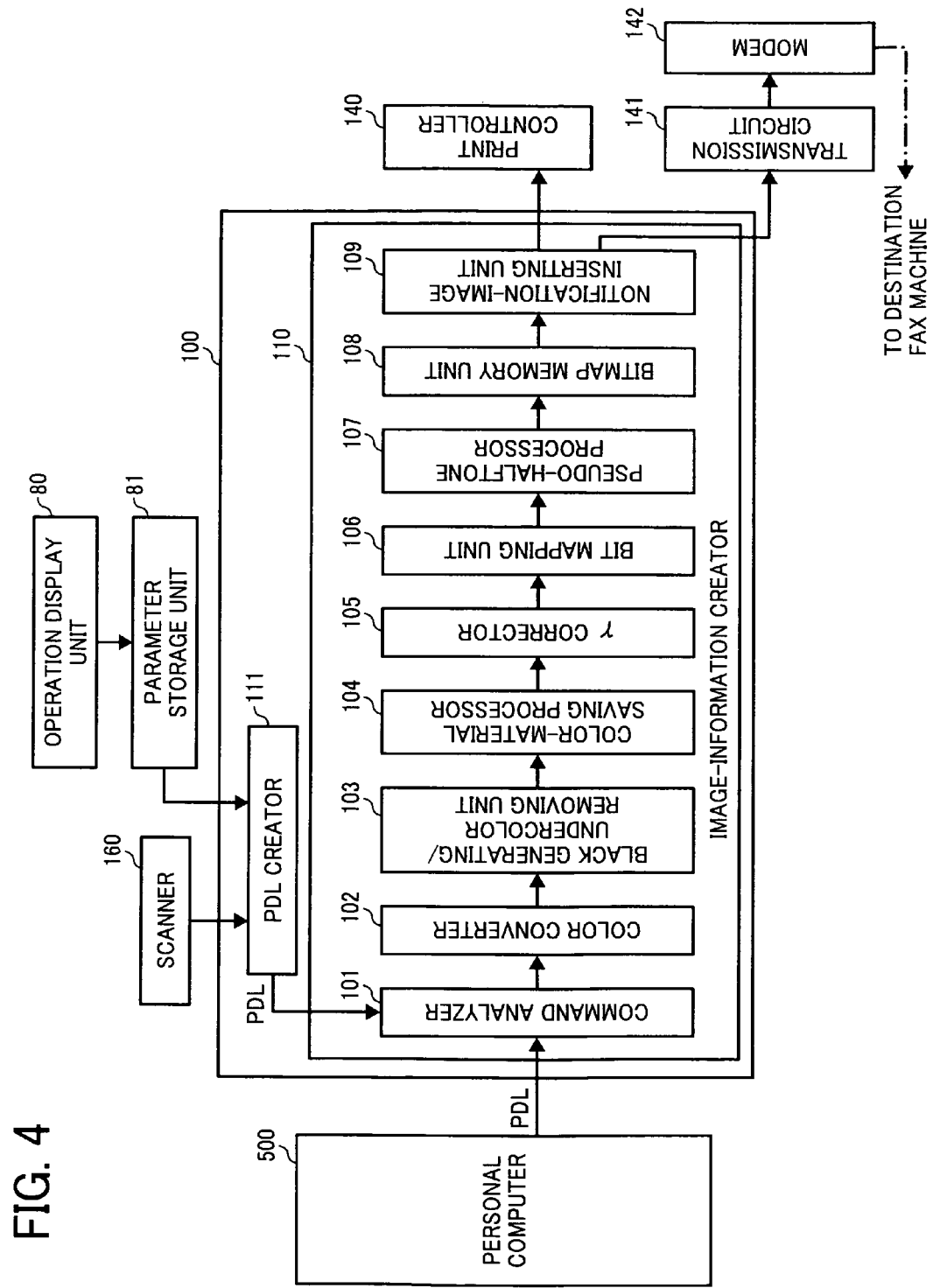
FIG. 4 is a block diagram of an image processing apparatus provided in the printer unit of the copy machine together with a scanner of the copy machine and a personal computer provided outside the copy machine.

FIG. 4 is a block diagram of an image processing apparatus provided in the printer unit of the copy machine together with the scanner of the copy machine and the personal computer provided outside the copy machine. The printer unit 1 of the copy machine (see FIG. 1) also includes an operation display unit 80, a parameter storage unit 81, an image processing apparatus 100, a print controller 140, a transmission circuit 141, and a modem 142 which are shown in FIG. 4, in addition to the devices as shown in FIG. 1.

A page description language (PDL) being image information read by the scanner 160 and image information sent from a personal computer 500 to the copy machine through the LAN cable is processed by the image processing apparatus 100. Thereafter, the PDL is used for image information by the printer unit 1 or is transmitted to a destination facsimile machine through the transmission circuit 141, the modem 142, and the telephone line.

The operation display unit 80 includes various keys and buttons, and a liquid crystal display, and stores a control parameter corresponding to an operation performed by a user using the various keys and buttons based on information displayed on the liquid crystal display in the parameter storage unit 81 formed with an integrated circuit (IC) memory or the like. The copy machine enables the user to set saving-status information, as one of control parameters, for setting ON or OFF of a color-material saving mode (toner saving mode). When copying or facsimile (fax) is to be operated, it is checked what is the content of the saving-status information stored in the parameter storage unit 81. When the content indicates saving of toner, an image of an original is converted to a color-material saved image, which is output by the printer unit 1 or is fax-transmitted to a destination. On the other hand, when the content indicates no saving of toner, a normal image from which an image of an original can be faithfully reproduced is output by the printer unit 1 or is fax-transmitted to a destination.

Figure 5:
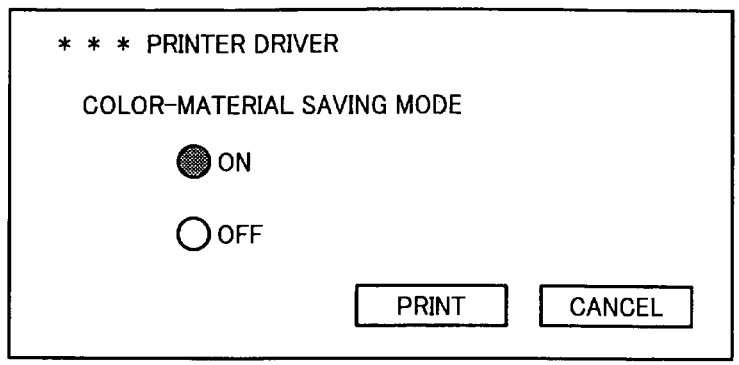
FIG. 5 is a schematic of an example of a dialog box displayed on a display by a printer driver to cause the copy machine in FIG. 1 to perform a printing operation.

The personal computer 500 converts information created with known various application software to PDL being image information by a printer driver or the like, and outputs the image information to an image forming apparatus such as a printer. When printing is instructed on the application software, the printer driver displays a dialog box as shown in FIG. 5 on the display. The dialog box is used by the user to select whether the toner being a color material for use in the printer unit of the copy machine is saved. Referring to the status of FIG. 5, of "ON" and "OFF check boxes for the color-material saving mode, the "ON" check box is checked. When a "print" button in the dialog box is clicked in this status, a saving ON command being the saving-status information of the content indicating that toner is saved is additionally written in the PDL for printing, and then the PDL is transmitted to the printer unit 1 of the copy machine. When the "print" button in the dialog box is clicked in a status in which the "OFF" check box is checked, differently from the shown status, a saving OFF command being the saving-status information of the content indicating that toner is not saved is additionally written therein, and then the PDL is transmitted to the printer unit 1 of the copy machine.

The image processing apparatus 100 includes an image-information creator 110 and a PDL creator 111 that function as an image-information creating unit. The image-information creator 110 also includes a command analyzer 101 being an image-information acquiring unit, a color converter 102, a black generating/undercolor removing unit 103, a color-material saving processor 104, a γ corrector 105, a bit mapping unit 106, a pseudo-halftone processor 107, a bitmap memory unit 108, and a notification-image inserting unit 109.

The PDL sent from the personal computer 500 to the copy machine through the LAN cable is input to the command analyzer 101 of the image processing apparatus 100 of the printer unit. In this configuration, the command analyzer 101 functions as an information acquiring unit that acquires PDL having original image information being information for the original image and the saving-status information. In the image processing apparatus 100 that receives the PDL from the personal computer 500, the image-information creator 110 creates color-material saved image or information for a normal image based on the PDL.

Specifically, the image-information creator 110 first analyzes commands in the PDL by the command analyzer 101. The image-information creator 110 then acquires type information of an object (text image information, graphic image information, and image picture information), a position and a size of an object, color information as to whether an image is color or monochrome, a color signal value (values of K, R, G, and B), and font information for text, based on a drawing command included in the commands.

Next, in the image-information creator 110, when the object as a target for drawing has to be drawn in color, the color converter 102 and the black generating/undercolor removing unit 103 convert color signals of R (red), G (green), and B (blue) corresponding to three primary colors of light to color signals of C (cyan), M (magenta), Y (yellow), and K (black) corresponding to three primary colors of the color material. Specifically, the color converter 102 converts RGB color signals to C'M'Y' color signals, and then the black generating/undercolor removing unit 103 converts the C'M'Y' color signals to CMYK color signals.

The color-material saving processor 104 converts values of CMYK color information in drawing commands corresponding to various objects output from the black generating/undercolor removing unit 103 based on the saving-status information and the input-output characteristics (FIG. 6) previously stored in a data storage unit. Specifically, when the saving-status information is the saving OFF command, the values of the CMYK color information in the drawing commands are converted based on characteristics shown as normal gamma (γ) in FIG. 6. On the other hand, when the saving-status information is the saving ON command, the values of the CMYK color information are converted based on characteristics shown as color-material saving γ in FIG. 6. The color-material saving γ is characterized in that a slope of the output values with respect to the input values is smaller than that of the normal γ, and therefore, the colors of CMYK in the color-material saving mode are lighter than these in the normal mode. This results in saving of C, M, Y, K-toner usage. It is noted that the slope of color-material saving γ is obtained by multiplying the slope of the normal γ by a number less than "1".

Figure 7:
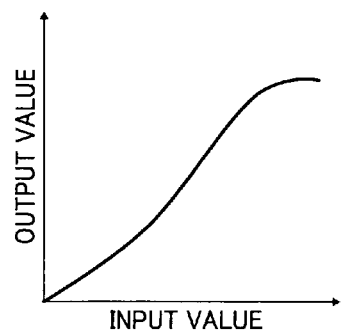
FIG. 7 is a graph of input-output characteristics used by a γ corrector provided in the image processing apparatus of the printer unit in FIG. 4.

The γ corrector 105 converts values of CMYK color information in the drawing commands corresponding to the various objects output from the color-material saving processor 104 based on the input-output characteristics shown in FIG. 7. The values are so-called gamma-corrected by the conversion, and the CMYK color information for the various objects become values suitable for the printer unit of the copy machine.

The bit mapping unit 106 decompresses the image in the bitmap format in a drawing memory area of the data storage unit (not shown) in the image processing apparatus 100, based on the gamma-corrected drawing command sent from the γ corrector 105.

The pseudo-halftone processor 107 decreases the number of bits of the image decompressed in the bitmap format, and performs a pseudo-halftone process to express the halftone of the image with the number of dots per unit area. Specifically, the image requiring a capacity of 8 bits for respective gradation expressions for CMYK is subjected to the pseudo-halftone process by performing a dither process that can express gradation with a capacity of 2 bits for CMYK respectively. A bitmap image after being dither-processed is stored in the bitmap memory unit 108 for each one page.

Figure 8:
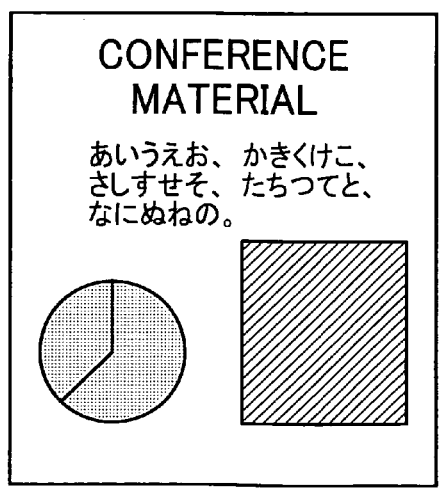
FIG. 8 is a schematic of an example of a printout of a normal image based on normal image information created by the image processing apparatus when a color-material saving mode is set to OFF.

When the saving-status information is the saving ON command, with the processes explained above, an image with a lighter tone than the original image i.e. a color-material saved image, being an image of which color material usage is reduced more than that of the normal image, is stored in the bitmap format in the bitmap memory unit 108. On the other hand, when the-saving-status information is the saving OFF command, as shown in FIG. 8, the normal image being a faithful reproduction of the original image is stored in the bitmap memory unit 108 in the bitmap format.

Figure 9:
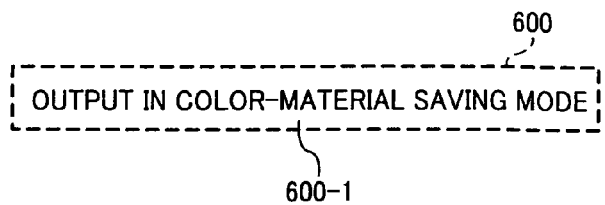
FIG. 9 is an enlarged schematic of an example of a notification image indicating saving condition.
Figure 10:
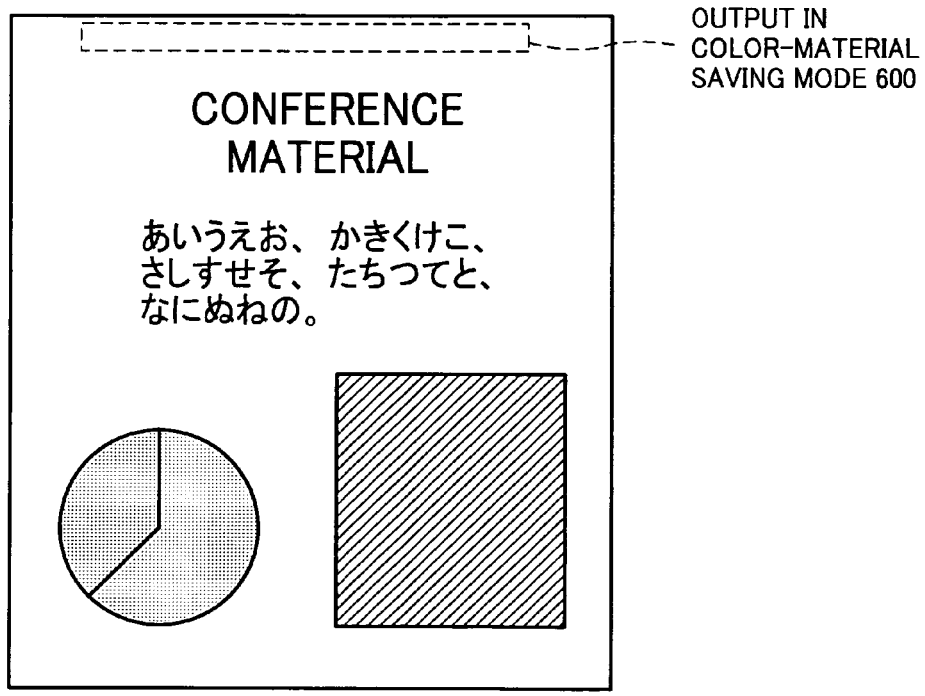

The notification-image inserting unit 109 stores data for predetermined notification images such as a notification image indicating saving condition in the data storage unit such as an IC memory chip (not shown). For example, a text image "Output in color-material saving mode" as shown in FIG. 9 is stored therein as a notification image 600 indicating saving condition (hereinafter, "notification image 600"). When the saving-status information is the saving ON command, or when the color-material saving mode is set to ON, the notification image 600 is added to the bitmap image, to create a color-material saved image. At this time, the notification image 600 is added to a header area in a one-page layout of the sheet to which the image is output. Thus, as shown in FIG. 10, for example, a color-material saved image is formed in an area except the header area and the footer area in the one-page layout. Specifically, the created color-material saved image includes a main image portion containing a text image, a graphic image, an image picture, or the like based on an original image and also includes the notification image 600 in the header area. It is noted that the notification image may be added to the footer area or to some other area in the one-page layout. It is also noted that the graphic image indicates an image, such as a graphic and a graph, in which color and shape are expressed by commands. The image picture indicates an image expressed by pixel-base color information such as a bitmap format, a Graphics Interchange Format (GIF), and a Joint Photographic Experts Group (JPEG) format.

Meanwhile, when the saving-status information is the saving OFF command, or when the color-material saving mode is set to OFF, the notification-image inserting unit 109 does not add the notification image 600 to the bitmap image but outputs the bitmap image as it is as a normal image to a next process.

The PDL sent from a personal computer or the like includes one for a print instruction and one for a fax instruction. When the PDL is for the fax instruction, information such as a fax instruction command and a fax number in addition to a PDL command is sent from the personal computer 500. When the created color-material saved image or normal image is based on the print instruction, the notification-image inserting unit 109 outputs information for the color-material saved image or for the normal image to the print controller 140. The print controller 140 controls the devices in the printer unit 1 and the paper feeding device 200, and executes the process for forming the color-material saved image or the normal image to the sheet based on the information sent from the notification-image inserting unit 109. Thus, a printout of the normal image shown in FIG. 8 or of the color-material saved image shown in FIG. 10 is output from the printer unit 1.

When the created color-material saved image or normal image is based on the fax instruction, the notification-image inserting unit 109 sends information for the color-material saved image or for the normal image to the transmission circuit 141. The transmission circuit 141 transmits received image information in the bitmap format to a destination fax machine through the modem 142 and the telephone line while converting the image information to a PDL formatted one. Thus, a printout of the normal image shown in FIG. 8 and of the color-material saved image shown in FIG. 10 is output from the destination fax machine.

As explained above, the copy machine also includes functions of printing an image scanned by the scanner 160 and fax-transmitting an image scanned by the scanner 160. When these functions are to be used, the following processes are executed. Specifically, when a copy start button in the operation display unit 80 is depressed to scan an original by the scanner 160, image information in RGB format thereof is sent to the PDL creator 111 of the image processing apparatus 100. The PDL creator 111 creates PDL based on the image information sent from the scanner 160. At this time, the PDL creator 111 determines whether the color-material saving mode in the saving-status information stored in the parameter storage unit 81 is ON or OFF. When it is ON, the saving ON command is added to the PDL. Further, when the image is read based on the fax instruction, the PDL creator 111 adds information such as the fax instruction command and the fax number to the PDL. In the configuration, similarly to the command analyzer 101, the PDL creator 111 also functions as an information acquiring unit that acquires the PDL containing the original image information, being information for the original image, and the saving-status information.

The PDL creator 111 sends the created PDL to the command analyzer 101 of the image-information creator 110. Hereinafter, the same process as the case where the PDL sent from the personal computer 500 is processed is performed.

In the copy machine configured in the above manner, an image, in which the notification image 600 used to notify that the image is formed under the color-material saving condition is added to the original image as shown in FIG. 10, is output as a color-material saved image to the printer unit 1 or to the destination fax machine. The notification image 600 enables a person viewing the color-material saved image output from the printer unit 1 or from the destination fax machine to recognize that the image is formed under the color-material saving condition, and it is thereby possible to avoid a false impression that the image may be handled by a low-performance device from being given to the person.

In a case of continuous printing over a plurality of pages, the color-material saving mode may be collectively set for all the pages or may be discretely set for each page. When it is collectively set for all the pages, the notification image is desirably added to the header of only the first page. This enables indications in a repetitive manner to be avoided as compared with a case in which the notification image is repetitively inserted in the headers of the pages.

There is known a facsimile machine, of the conventional facsimile machines, in which information (sending name and machine registration number, or the like) allowing a communication date and a source to be identified is inserted in a transmission header of a document. This configuration enables certainty of the information of the received document to be ensured, however, when the color-material saving mode is executed, there may still remain the false impression given to the receiver that the image is handled by a low-performance machine. On the other hand, the copy machine according to the first embodiment can avoid manufacturers and sellers of the machines from giving the false impression to users of the copy machine or to persons at distributed destinations of the color-material saved image. Moreover, it is possible to make a strong appeal that the copy machine contributes to environmental protection by executing the color-material saving mode.

As is previously shown, in the copy machine, the image-information creator 110 is configured so as to add the text image being the notification image 600 to the original image. This configuration allows any person who can read text to surely recognize the color-material saved image as the image formed under the color-material saving condition.

Figure 11:
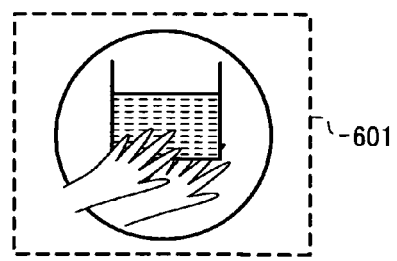
FIG. 11 is a schematic of a notification image indicating saving condition in a modification of the copy machine according to the first embodiment.

FIG. 11 is a schematic of a notification image indicating saving condition in a modification of the copy machine according to the first embodiment. The image-information creator 110 of the copy machine according to the modification is configured to add a picture image including a picture such as a logo and a mark, being a notification image 601 indicating saving condition (hereinafter, "notification image 601"), to the original image. In this configuration, the notification image 601 allows any person to immediately recognize the color-material saved image as the image formed under the color-material saving condition.

Next, copy machines of Examples in which a more characteristic configuration is added to the copy machine according to the first embodiment are explained below. It is noted that each configuration of the copy machines according to Examples is the same as that of the first embodiment unless otherwise specified.

FIRST EXAMPLE

If a notification image indicating saving condition (hereinafter, "notification image") (600 or 601) is added to a predetermined position (e.g., header area) of a page layout in the original image, this causes an increase in the consumption of toner as a color material by an amount required to form the notification image. If the notification image is added thereto using a high-use-frequency character size (up to 11 pt) and monochrome, the toner consumption is not increased so much. Even though the toner consumption is small, a saving amount is still reduced despite execution of the color-material saving mode.

Figure 12:
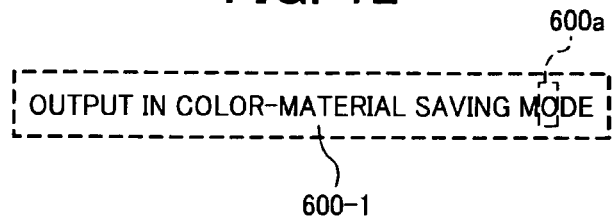
FIG. 12 is a schematic of a notification image indicating saving condition added to an original image by an image-information creator of a copy machine according to a first example.
Figure 13:
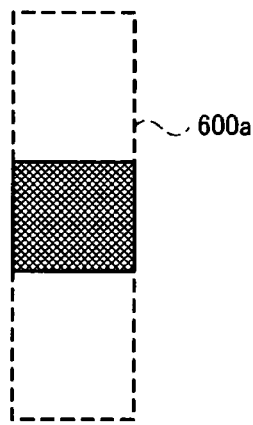
FIG. 13 is a partially enlarged schematic of the notification image indicating saving condition in FIG. 12.

FIG. 12 is a schematic of a notification image added to an original image by an image-information creator of a copy machine according to a first example. In similar manner to the first embodiment, an image including a text image as the notification image 600 is added to the original image. However, the text image is different from that of the first embodiment in a point that the text image is formed with K toner at halftone density. A portion of a character "-" in the text image shown in FIG. 12 is enlarged in FIG. 13. It is understood from FIG. 13 that the portion is an intermediate-density image portion in which dots are arranged at predetermined intervals therebetween but not a high-density image portion in which dots are arranged without intervals therebetween. The data for the notification image 600 at the halftone density is stored in the data storage unit of the notification-image inserting unit 109.

This configuration allows minimization of an increase in toner consumption due to addition of the notification image 600, as compared with the case in which a high-density image is added as the notification image 600.

It is noted that the notification image can also be added to the original image without using the color material such as toner. For example, if the notification image is added thereto by an embossing process or a punch-hole process, it is possible to avoid the use of the color material. In this case, an emboss processing unit or a punch-hole processing unit is simply provided in the copy machine.

SECOND EXAMPLE

A copy machine according to a second example can set a saving amount of the color material when the color-material saving mode is executed.

Figure 14:
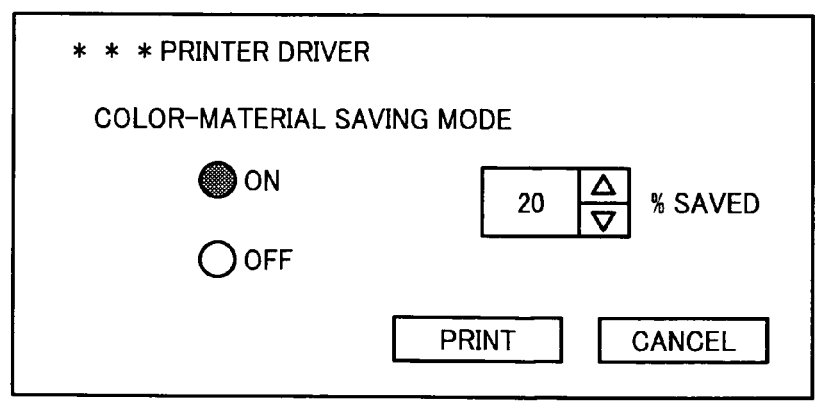
FIG. 14 is a schematic of an example of a dialog box displayed on a display of a personal computer in which a printer driver attached to a copy machine according to a second example is installed.

FIG. 14 is a schematic of an example of a dialog box displayed on a display of a personal computer in which a printer driver attached to the copy machine according to the second example is installed. The printer driver displays a dialog box as shown in FIG. 14 on the display when a print instruction is issued on the application software. The dialog box is used for the user to enter information as to whether the color-material saving mode is executed and information for a color-material saved amount (color-material saving rate) in the color-material saving mode. The ON and OFF check boxes in the dialog box have the same function as that of the first embodiment.

Arranged in the dialog box is a combo box used to enter a color-material saving rate in addition to the check boxes used to set ON and OFF of the color-material saving mode. By clicking an upper arrow mark or a lower arrow mark in the combo box, it is possible to select one of color-material saving rates: 20%, 50%, and 80%. As shown in FIG. 14, the color-material saving rate is set to 20%. The "print" button in the dialog box is clicked in the above status, and in the personal computer, the saving ON command being the saving-status information indicating saving of toner and color-material saving rate information being the saved-amount information are additionally written in the PDL for printing. The PDL including these information is transmitted to the command analyzer 101 of the image processing apparatus 100 in the copy machine. Specifically, in the copy machine according to the second example, the command analyzer 101 functions as an information acquiring unit that acquires the color-material saving rate information being the saved-amount information indicating how much amount of the color material is saved with respect to an amount of the color material required to form the original image.

The copy machine according to the second example is configured to set a color-material saving rate required when an image read by the scanner 160 is printed or an image read by the scanner 160 is fax-transmitted, by a key operation of the operation display unit 80. The color-material saving rate entered by the key operation is stored in the parameter storage unit 81 of the printer unit 1. The copy start button in the operation display unit 80 is depressed, an original is read by the scanner 160, and image information of the scanned original in RGB format is sent to the PDL creator 111 of the image processing apparatus 100. The PDL creator 111 creates the PDL based on the image information sent from the scanner 160. At this time, when the saving-status information stored in the parameter storage unit 81 indicates the color-material saving mode being ON, the PDL creator 111 reads the information for the color-material saving rate from the parameter storage unit 81, and then, additionally writes the saving ON command and the information for the color-material saving rate in the PDL. In this configuration, similarly to the command analyzer 101, the PDL creator 111 also functions as an information acquiring unit that acquires the color-material saving rate information being the saved-amount information indicating how much amount of the color material is saved with respect to the amount of the color material required to form the original image.

The color-material saving processor 104 of the image-information creator 110 converts values of color information for CMYK in drawing commands corresponding to various objects output from the black generating/undercolor removing unit 103 to values based on the saving-status information and the input-output characteristics (FIG. 15) previously stored in the data storage unit. Specifically, when the saving-status information is the saving OFF command, the values of color information for CMYK in the drawing commands are converted to values based on characteristics represented as normal γ in FIG. 15. On the other hand, when the saving-status information is the saving ON command and the color-material saving rate is 20%, the values of color information for CMYK in the drawing commands are converted based on characteristics represented as color-material saving γ_20% in FIG. 15. When the saving-status information is the saving ON command and the color-material saving rate is 50%, the values of color information for CMYK in the drawing commands are converted based on characteristics represented as color-material saving γ_50% in FIG. 15. Further, when the saving-status information is the saving ON command and the color-material saving rate is 80%, the values of color information for CMYK in the drawing commands are converted based on characteristics represented as color-material saving γ_80% in FIG. 15. The slope of the color-material saving γ is obtained by multiplying the slope of the normal γ by a number less than "1". That is, each slope of color-material saving γ_20%, color-material saving γ_50%, and color-material saving γ_80% is obtained by multiplying the slope of the normal γ by each number of "0.8", "0.5", and "0.2", respectively. Thus, when the color-material saving rate is 20%, 50%, and 80%, then each toner usage is reduced by about 20%, 50%, and 80% respectively as compared with normal toner usage.

Figure 16:
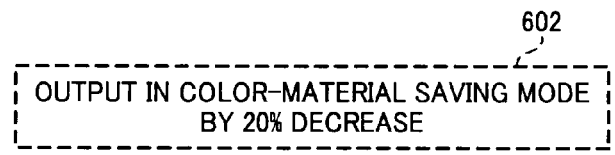
FIG. 16 is a schematic of a notification image added to an original image by an image-information creator of the copy machine according to the second example.

FIG. 16 is a schematic of a notification image added to an original image by an image-information creator of the copy machine according to the second example. A notification image 602 includes a notification image indicating saving condition for notifying the image that is formed in the color-material saving mode, and a saved-amount notification image for notifying the information for the color-material saving rate being the saved-amount information. Specifically, the notification image 602 includes the notification image that consists of text images "output" and "in color-material saving mode", and the saved-amount notification image that consists of a text image "by a 20% decrease". That is, the shown notification image 602 is added to the original image when the color-material saving rate is set to 20%, and is stored in the data storage unit of the notification-image inserting unit 109. The notification-image inserting unit 109 stores data for notification images, other than the data for the notification image, to be added to the original image when the color-material saving rate is set to 50% and 80% respectively in the data storage unit.

This configuration enables a person viewing the color-material saved image output from the printer unit 1 of the copy machine or from a destination fax machine to recognize how much amount of the color material is saved to output the color-material saved image, using the saved-amount notification image.

Figure 17:
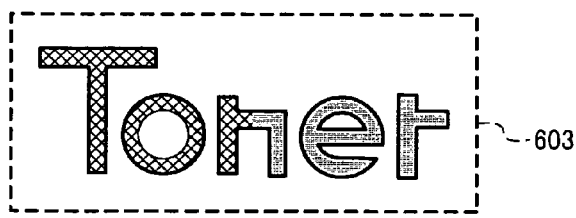
FIG. 17 is a schematic of an example of a notification image (color-material saving rate: 50%) in a first modification of the copy machine according to the second example.
Figure 18:
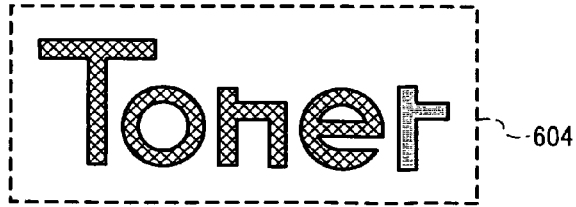
FIG. 18 is a schematic of an example of a notification image (color-material saving rate: 80%) in the first modification of the copy machine according to the second example.

FIG. 17 is a schematic of an example of a notification image (color-material saving rate: 50%) in a first modification of the copy machine according to the second example. The image-information creator 110 of the copy machine according to the first modification adds an image as follows being a notification image 603 to the original image. The image contains a notification image indicating saving condition with a picture image and a saved-amount notification image also with a picture image. Specifically, FIG. 17 shows an example of the notification image 603 when the color-material saving rate is set to 50%. The notification image 603 represents a mark formed with characters "Toner" in which the notification image is expressed by the entire shape of the mark to notify the user that the color-material saved image is formed in the color-material saving mode. The saved-amount notification image is expressed by an area of a shaded portion in the mark. Specifically, the mark has the shaded portion, in which void portions are formed at predetermined intervals so as to be easily visible to the naked eye, and has a normal portion in which the void portions are not formed. An area ratio of the shaded portion to an area of the entire mark is equal to the color-material saving rate. In the shown example, the area ratio is about 50%, and this enables the person viewing the color-material saved image to recognize that this image is formed under the condition of the color-material saving rate being 50%. When the color-material saving rate is set to 80%, a notification image 604 shown in FIG. 18, instead of the notification image 603 shown in FIG. 17, is added to the original image. This configuration enables the user to immediately recognize the color-material saving rate through the saved-amount notification image.

Next, a second modification of the copy machine according to the second example is explained below. The copy machine according to the second example creates the information for the color-material saved images with the color-material saving rates of 20%, 50%, and 80% based on the input-output characteristics shown in FIG. 15. However, there occurs a slight difference between an actual color-material saving rate for the color-material saved image formed based on the condition and the set color-material saving rate. This is because there occurs a slight difference between a decreasing rate of the slope of the color-material saving γ with respect to the normal γ and a toner saving rate.

The copy machine according to the second modification is therefore configured to calculate an actual color-material saving rate and add a saved-amount notification image formed according to the calculated result to the original image.

Figure 19:
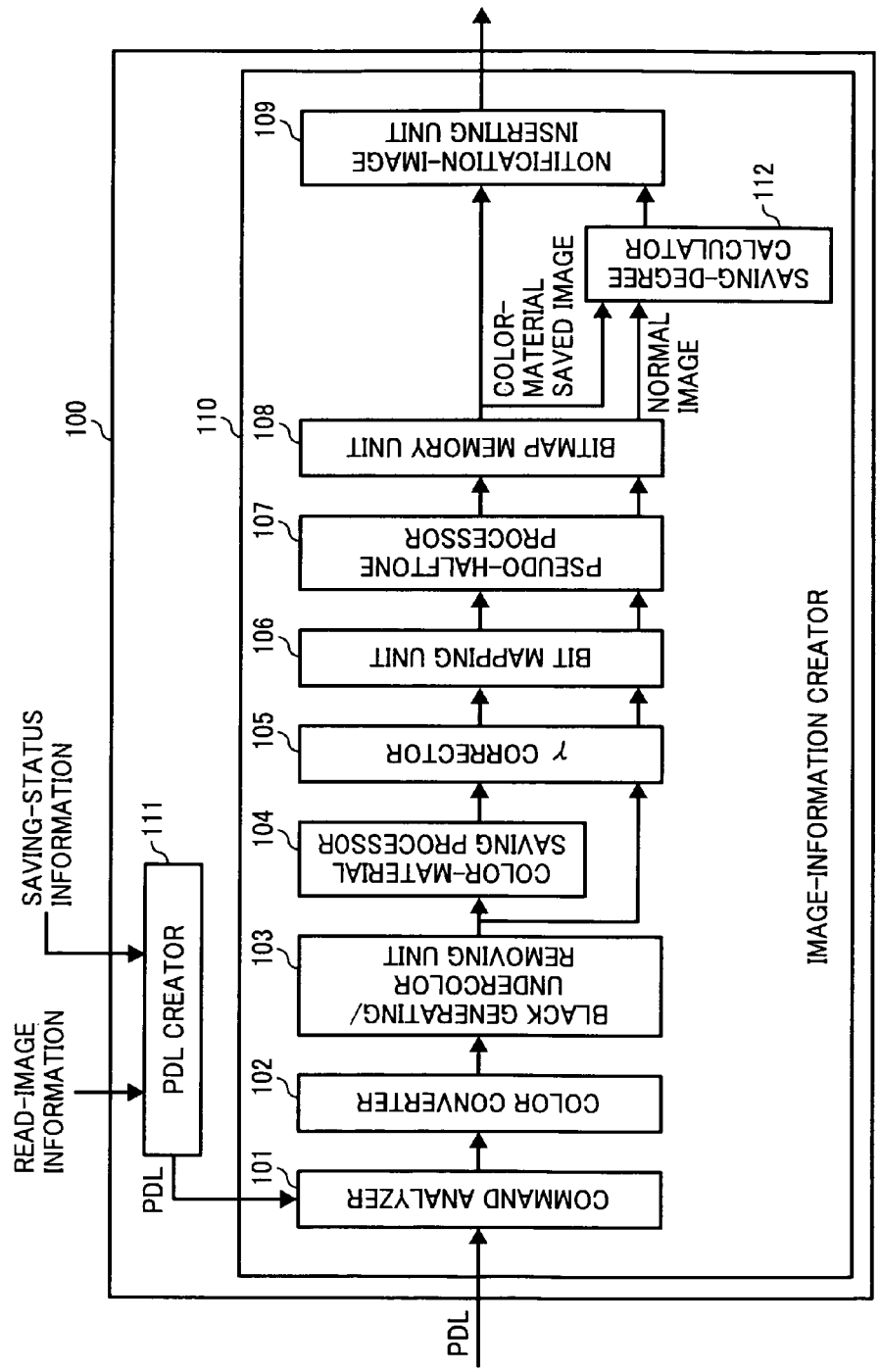
FIG. 19 is a block diagram of a circuit configuration of an image processing apparatus of a copy machine according to a second modification of the second example.

FIG. 19 is a block diagram of a circuit configuration of the image processing apparatus of the copy machine according to the second modification. The image-information creator 110 of the image processing apparatus 100 includes a saving-degree calculator 112 that calculates an actual color-material saving rate. Respectively decompressed in the bitmap format in the bitmap memory unit 108 are the normal image that does not pass through the color-material saving processor 104 and the color-material saved image that passes through the color-material saving processor 104. The saving-degree calculator 112 calculates each consumption of the C, M, Y, and K toners in the normal image and each consumption of the C, M, Y, and K toners in the color-material saved image.

A 2-bit dither process in the pseudo-halftone processor 107 is designed so as to perform any one of the following processes: a dot is not output for one pixel, a small dot is output, a medium dot is output, and a large dot is output.

Figure 20:
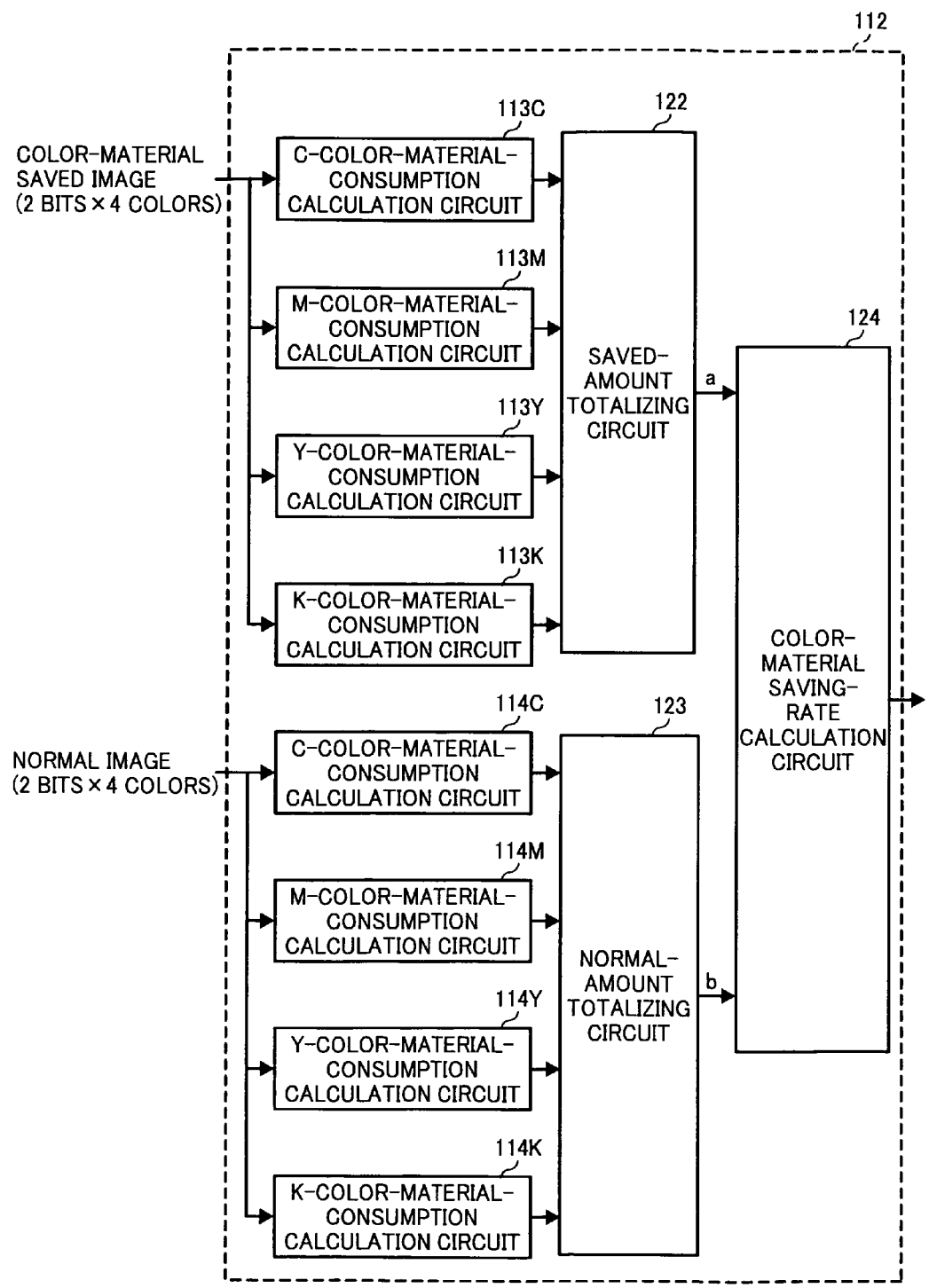
FIG. 20 is a block diagram of a circuit configuration of a saving-degree calculator in the image processing apparatus of FIG. 19.
Figure 21:
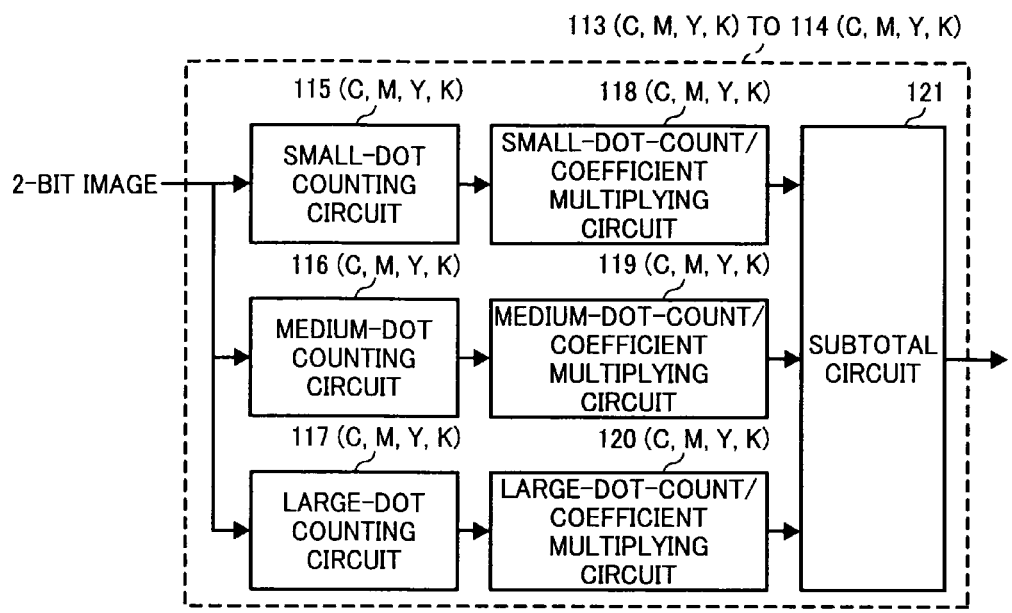
FIG. 21 is a block diagram of a circuit configuration of each of color-material-consumption calculation circuits for colors in the saving-degree calculator of FIG. 20.

FIG. 20 is a block diagram of a circuit configuration of the saving-degree calculator, and FIG. 21 is a block diagram of a circuit configuration of a color-material-consumption calculation circuit for each color in the saving-degree calculator of FIG. 20. As shown in FIG. 20, the saving-degree calculator 112 includes eight color-material-consumption calculation circuits 113C, 113M, 113Y, 113K, 114C, 114M, 114Y, and 114K, a saved-amount totalizing circuit 122, a normal-amount totalizing circuit 123, and a color-material saving-rate calculation circuit 124. The four calculation circuits 113C, 113M, 113Y, and 113K out of the eight color-material-consumption calculation circuits are used to calculate each consumption of the C, M, Y, and K toners in the color-material saved image. The remaining four calculation circuits 114C, 114M, 114Y, and 114K are used to calculate each consumption of the C, M, Y, and K toners in the normal image.

Each of the color-material-consumption calculation circuits 113C, 113M, 113Y, 113K, 114C, 114M, 114Y, and 114K includes various types of circuits as shown in FIG. 21. Specifically, the color-material-consumption calculation circuit includes a small-dot counting circuit 115 (C, M, Y, K), a medium-dot counting circuit 116 (C, M, Y, K), a large-dot counting circuit 117 (C, M, Y, K), a small-dot-count/coefficient multiplying circuit 118 (C, M, Y, K), a medium-dot-count/coefficient multiplying circuit 119 (C, M, Y, K), a large-dot-count/coefficient multiplying circuit 120 (C, M, Y, K), and a subtotal circuit 121 (C, M, Y, K).

The small-dot counting circuit 115 (C, M, Y, K) counts the number of small dots of C, M, Y, or K in the color-material saved image or the normal image, and sends the result of counting to the small-dot-count/coefficient multiplying circuit 118 (C, M, Y, K). The small-dot-count/coefficient multiplying circuit 118 (C, M, Y, K) multiplies the sent result of counting by a predetermined coefficient, and thereby converts the small-dot counted number of C, M, Y, or K to a consumption of the C, M, Y, or K toner due to output of the small dots.

The medium-dot counting circuit 116 (C, M, Y, K) counts the number of medium dots of C, M, Y, or K in the color-material saved image or the normal image, and sends the result of counting to the medium-dot-count/coefficient multiplying circuit 119 (C, M, Y, K). The medium-dot-count/coefficient multiplying circuit 119 (C, M, Y, K) multiplies the sent result of counting by a predetermined coefficient, and thereby converts the medium-dot counted number of C, M, Y, or K to a consumption of the C, M, Y, or K toner due to output of the medium dots.

The large-dot counting circuit 117 (C, M, Y, K) counts the number of large dots of C, M, Y, or K in the color-material saved image or the normal image, and sends the result of counting to the large-dot-count/coefficient multiplying circuit 120 (C, M, Y, K). The large-dot-count/coefficient multiplying circuit 120 (C, M, Y, K) multiplies the sent result of counting by a predetermined coefficient, and thereby converts the large-dot counted number of C, M, Y, or K to a consumption of the C, M, Y, or K toner due to output of the large dots.

The subtotal circuit 121 adds up the consumption of the C, M, Y, or K toner due to output of the small dots, the consumption of the C, M, Y, or K toner due to output of the medium dots, and the consumption of the C, M, Y, or K toner due to output of the large dots, and outputs a subtotal value to the saved-amount totalizing circuit 122 or to the normal-amount totalizing circuit 123 shown in FIG. 20. The saved-amount totalizing circuit 122 sums up the subtotal values received from the four color-material-consumption calculation circuits 113C, 113M, 113Y, and 113K each of which calculates the toner consumption in the color-material saved image, and then calculates toner consumption "a" in the color-material saved image. The normal-amount totalizing circuit 123 sums up the subtotal values received from the four color-material-consumption calculation circuits 114C, 114M, 114Y, and 114K each of which calculates the toner consumption in the normal image, and calculates toner consumption "b" in the normal image. The color-material saving-rate calculation circuit 124 executes an arithmetic expression of "(b−a)/b×100" to calculate a color-material saving rate, and outputs the calculated result to the notification-image inserting unit 109.

The notification-image inserting unit 109 loads an image, of the notification images stored in the data storage unit, corresponding to the color-material saving rate sent from the color-material saving-rate calculation circuit 124, from the data storage unit and adds the image to the original image.

This configuration enables the person viewing the color-material saved image output from a destination fax machine to exactly recognize, by the saved-amount notification image, how much amount of the color material is saved to output the color-material saved image.

Next, a copy machine of a specific example in which a more characteristic configuration is added to the copy machine according to the second example is explained below. It is noted that the configuration of the copy machine according to the specific example is the same as that of the second example unless otherwise specified.

SPECIFIC EXAMPLE

When the color-material saving mode is ON, the copy machine according to the specific example is configured not to execute a process for color-material saving to all types of object images contained in the PDL but execute the process only to a specific type of object image therein. Table 1 shows a relationship between a type of an object image and a process of color-material saving.

TABLE 1

|  | Type of object | | |
| --- | --- | --- | --- |
|  | Text | Graphic | Image |
| Color-material saving mode: OFF |  | Normal γ | |
| Color-material saving mode: ON | Normal γ | Color-material saving γ | Color-material saving γ |

As shown in Table 1, the type of the object image is divided into three types: a text image, a graphic image, and an image picture. When the color-material saving mode is OFF, the process for the color-material saving performed on all the three types is naturally omitted, and the color-material saving processor 104 selects the normal γ as the input-output characteristics. Meanwhile, when the color-material saving mode is ON, the color-material saving γ is selected and the process for the color-material saving is performed only on the two types of the graphic image and the image picture. The normal γ is selected for the text image and the process for the color-material saving is omitted. By removing the text image from objects for the color-material saving, the color-material saved image excellent in readability of text can be output.

In the configuration, when only the text image is contained in a one-page image, the image quality and the image density of the main image portion corresponding to the original image when the color-material saving mode is ON are completely the same as those when it is OFF. This is because when only the text image is contained in the one-page image, even if the color-material saving mode is set to ON, the process for the color-material saving is not performed on the text image. Despite this, if the notification image is added to the original image, this image may give the false impression to the person viewing the output image that the image quality is as high as that of the case in which the color material is not saved although the color material is saved.

Therefore, when an image as an object for the color-material saving is not contained in the one-page image, the image-information creator 110 of the copy machine according to the specific example creates information for the normal image to which no notification image is added even if the color-material saving mode is ON. Specifically, the command analyzer 101 of the image-information creator 110 determines whether a graphic image and an image picture as objects for the color-material saving are contained in one-page PDL. When either one of the images is contained therein, the command analyzer 101 transmits an insertion execution signal to the notification-image inserting unit 109. On the other hand, when no images are contained therein, the command analyzer 101 transmits an insertion stop signal to the notification-image inserting unit 109.

When the insertion execution signal is transmitted from the command analyzer 101, the notification-image inserting unit 109 creates information for a color-material saved image with the notification image added thereto in the header area of the page layout. On the other hand, when the insertion stop signal is transmitted from the command analyzer 101, the notification-image inserting unit 109 stops adding the notification image to the header area. Thus, the information for the normal image without adding the notification image thereto is created.

Figure 22:
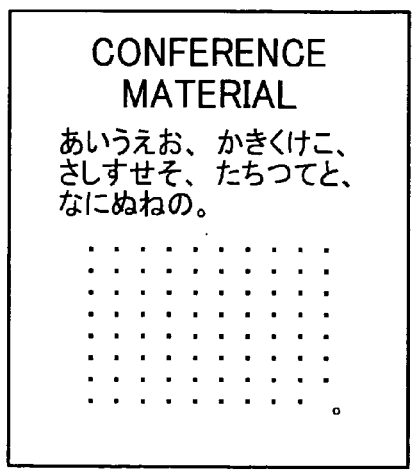
FIG. 22 is a schematic of an example of a printout based on image information created by the image-information creator when the color-material saving mode is OFF in a copy machine according to a specific example.
Figure 23:
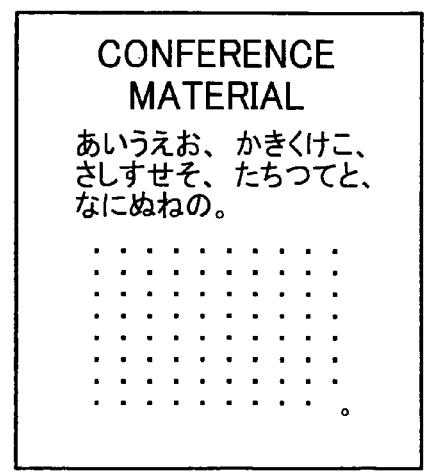
FIG. 23 is a schematic of an example of a printout based on image information created by the image-information creator when the color-material saving mode is ON in the copy machine according to the specific example.

FIG. 22 is a schematic of an example of a printout based on image information created by the image-information creator 110 when the color-material saving mode is OFF. FIG. 23 is a schematic of an example of a printout based on image information created by the image-information creator 110 when the color-material saving mode is ON. As is clear from the figures, the images of the both printouts are absolutely the same as each other. This is because, as shown in the figures, because the graphic image and the image picture are not contained in the one-page image, the normal image is output even if the color-material saving mode is ON.

In this configuration, because the object image being a type of an object for the color-material saving is not contained in the one-page image, even when the color-material saving mode is ON, the image not subjected to color-material saving at all is output. Even in this situation, a person viewing the output image has a false impression. This configuration enables to avoid the false impression from being given to the person, the false impression being such that the image quality is as high as that of the case in which the color material is not saved although the color material is saved.

In the present invention, a relationship between the type of the object image and the execution of the color-material saving is not limited to the relationship as shown in Table 1. For example, if reproducibility of an image picture is prioritized, only the text image and the graphic image may be set to objects for the color-material saving. In this case, it is simply configured to determine whether the text image and the graphic image exist in the page and stop, when they do not exist therein, the addition of the notification image even if the color-material saving mode is ON. Furthermore, when reproducibility of a graphic image is prioritized, only the character image and the image picture may be set to objects for the color-material saving.

Moreover, when a plurality of pages is to be output and a specific type of object image being an object for the color-material saving is contained in any one of the pages, the notification image may be added only to a first page thereof.

Next, a copy machine according to a detailed example in which a further characteristic configuration is added to the copy machine according to the specific example will be explained below. It is noted that the configuration of the copy machine according to the detailed example is the same as that of the specific example unless otherwise specified.

DETAILED EXAMPLE

Figure 15:
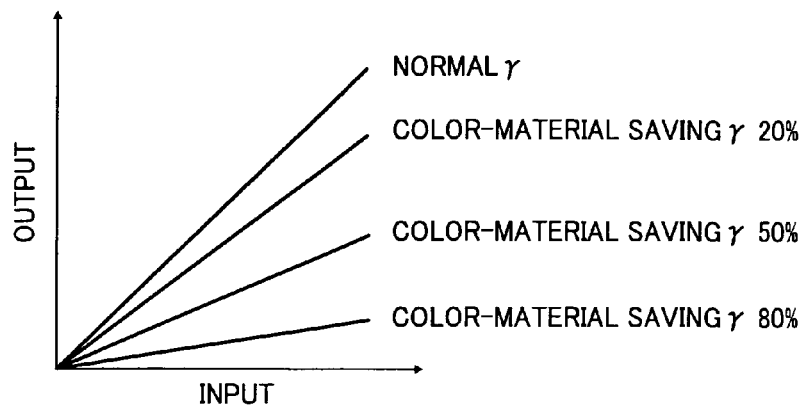
FIG. 15 is a graph of input-output characteristics used by the color-material saving processor provided in the image processing apparatus of the printer unit in FIG. 4.

The color-material saving processor 104 of the image-information creator 110 in a copy machine according to a detailed example uses characteristics of color-material saving γ__100%, in addition to the normal γ, the color-material saving γ__20%, the color-material saving γ__50%, and the color-material saving γ__80% being the input-output characteristics as shown in FIG. 15. Further, it is possible to select "100%" as the color-material saving rate through an input operation using the dialog box or using the operation display unit 80. When the color-material saving rate is 100%, this means that the image formation is not performed using toner, however, this is only for the specific type of object image (graphic image and image picture), and thus, the text image is formed under the condition of the color-material saving rate being 0%.

When the color-material saving rate is set to 100% and the color-material saving mode is ON, the graphic image and the image picture contained in the original image are not output at all, which makes the user difficult to recognize that these images are originally contained in the original image. Therefore, the image-information creator 110 of the copy machine according to the detailed example creates an image in which each notification image is superimposed on the graphic image and the image picture being the specific types of image as objects for the color-material saving. Moreover, the notification image including the following two images is used: a notification image indicating saving condition, and a type notification image for notifying a type of an image as an object for color-material saving on which the notification image is superimposed.

Figure 24:
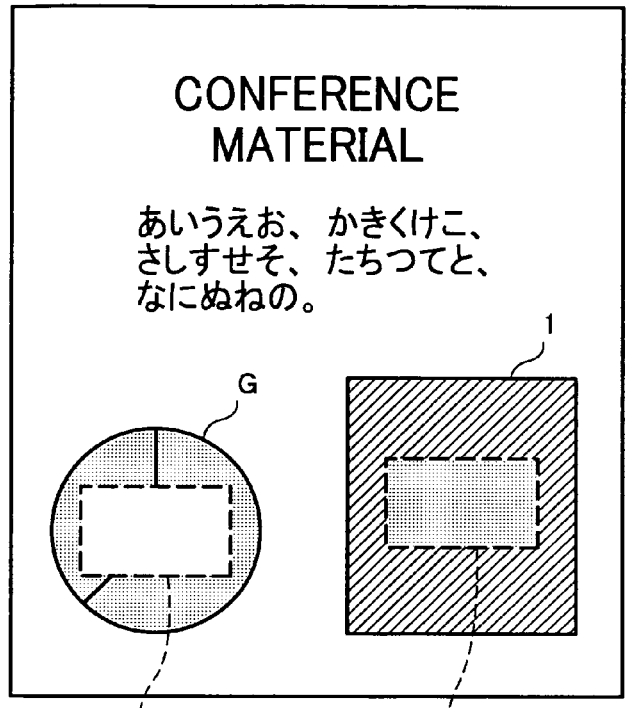
FIG. 24 is a schematic of an example of a printout when the color-material saving rate is set to 50% and the color-material saving mode is ON in a copy machine according to a detailed example.

FIG. 24 is a schematic of an example of a printout when the color-material saving rate is set to 50% and the color-material saving mode is ON. A one-page area of the printout includes three types of images such as a text image, a graphic image G, and an image picture I. Among these, the graphic image G and the image picture I are subjected to the color-material saving process at a color-material saving rate of 50%, however, the text image is not subjected to the process for color-material saving. A notification image 606 for graphic is superimposed on the graphic image G, while a notification image 607 for an image is superimposed on the image picture I.

Figure 25:
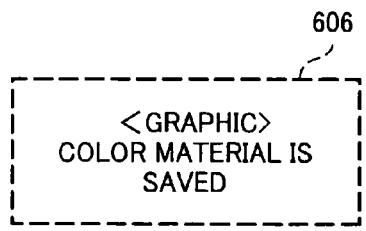
FIG. 25 is an enlarged schematic of a notification image for graphic to be superimposed on a graphic image G of FIG. 24 in the copy machine according to the detailed example.

FIG. 25 is an enlarged schematic of the notification image for-graphic superimposed on the graphic image G of FIG. 24. The notification image 606 includes the notification image that consists of a text image "Color material is saved" and the type notification image that consists of a text image "<Graphic>".

Figure 26:
FIG. 26 is an enlarged schematic of a notification image for an image to be superimposed on an image picture I of FIG. 24 in the copy machine according to the detailed example.

FIG. 26 is an enlarged schematic of a notification image for graphic superimposed on the graphic image I of FIG. 24. The notification image 607 includes the notification image that consists of the text image "Color material is saved" and the type notification image that consists of a text image "<Image>".

As shown in FIG. 24, each of the notification image 606 for the graphic and the notification image 607 for the image is superimposed on an image as an object for color-material saving, in a state in which the background color of the images is white. Thus, the notification image (606 or 607) can easily be read even if it is on the image as the object for color-material saving. It is noted that the background color of the notification image may be made semi-transparent and a light-colored image as an object for color-material saving may be displayed in the background.

Figure 27:
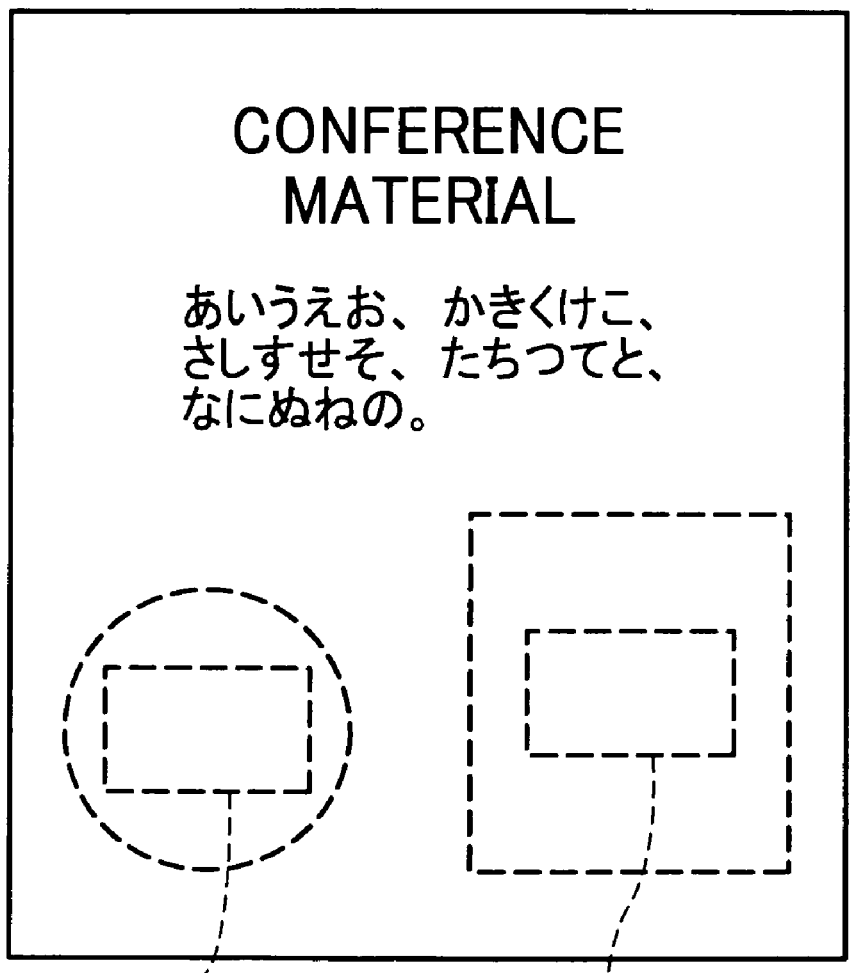
FIG. 27 is a schematic of an example of a printout when the color-material saving rate is set to 100% and the color-material saving mode is ON in the copy machine according to the detailed example.

FIG. 27 is a schematic of an example of a printout when the color-material saving rate is set to 100% and the color-material saving mode is ON. A one-page area in the printout includes only text images, and an image indicated by the numeral 606 among the text images is the notification image for the graphic shown in FIG. 25. An image indicated by the numeral 607 is the notification image for the image shown in FIG. 26. The other part of the text images corresponds to the original image. The notification image 606 and the notification image 607 are surrounded by dotted lines respectively, however, the dotted line is added to each of the images just for the purpose of making clear the shape of the graphic image and the shape of the image picture that are supposed to originally exist. Thus, the dotted lines are not printed on an actual printout.

Because the color-material saving rate is set to 100%, the graphic image G and the image picture I are not output at all, but the notification image 606 and the notification image 607 are output so as to be superimposed on the areas of the images respectively.

In this configuration, even if the type of a specific type of image becomes difficult to be read because the color-material saving rate is set to a comparatively high value although it is not 100%, the type notification image contained in the notification image (606 and 607) allows the user to easily recognize the type. Furthermore, even if a specific type of image is not output at all because the color-material saving rate is set to 100%, the type notification image enables the user to easily recognize the position where the image is supposed to exist, and the type of the image.

The example of the copy machine that forms a multicolor image by superimposing the color material of each color on top of one another is explained so far, however, the present invention is also applicable to an image forming apparatus that forms only a monochrome image and to an image processing apparatus included in the image forming apparatus.

Further, the example of the copy machine that forms an image using toner as a color material and using the electrophotographic process is explained so far, however, the present invention is also applicable to an image forming apparatus that forms an image using toner in a system different from the electrophotographic process and to an image processing apparatus included in the image forming apparatus. For example, the present invention is also applicable to an image forming apparatus that forms a toner image using a direct recording system. The direct recording system mentioned here indicates formation of a pixel image by causing a toner group flied from a toner flying device in a dot manner to directly adhere to a recording material or an intermediate recording element without using a latent-image carrier. That is, the direct recording system is a system of directly forming a toner image on a recording material or on an intermediate recording element. This system is employed in an image forming apparatus described in Japanese Patent Application Laid-open No. 2002-307737 or the like.

Moreover, the present invention is applicable to an image forming apparatus that forms an image using some other material different from toner as a color material and also to an image processing apparatus included in the image forming apparatus. For example, the present invention is also applicable to an image forming apparatus that forms an image in an ink jet system using ink as the color material.

In addition to the image forming apparatus and the image processing apparatus, the present invention is also applicable to a machine-readable recording medium such as a compact disk read only memory (CD-ROM) and a flash memory in which a program causing a computer to function is recorded as the image processing apparatus 100 according to the first embodiment.

In the copy machine according to the first embodiment, the image-information creator 110 is configured so as to add information for a text image being the information for the notification image 600 to the original image. As explained above, this configuration enables any person who can read text to surely recognize that the color-material saved image is formed under the color-material saving condition.

In the modifications of the copy machine according to the first embodiment, the image-information creator 110 is configured so as to add information for a picture image being the information for the notification image 601 to the original image. In this configuration, as explained above, the notification image 601 enables the person to immediately recognize that the color-material saved image 601 is formed under the color-material saving condition.

In the copy machine according to the first example, the image-information creator 110 is configured so as to add information for an image at halftone density being the information for the notification image 600 to the original image. As explained above, this configuration enables minimization of an increase in toner consumption due to addition of the notification image 600 as compared with the case in which a high-density image as the notification image 600 is added thereto.

In the copy machine according to the second example, the command analyzer 101 and the PDL creator 111 being the information acquiring units are configured so as to acquire information for the color-material saving rate being the saved-amount information which is information indicating how much amount of the color material is saved with respect to an amount of the color material required to form the original image. Furthermore, the image-information creator 110 is configured so as to create information, being information for the color-material saved image, which is information for an image capable of being formed at the color-material saving rate indicated by the information for the color-material saving rate and to which the saved-amount notification image is added to notify the color-material saving rate. As explained above, this configuration enables the person viewing the color-material saved image output from the printer unit 1 or a destination fax machine to recognize, by the saved-amount notification image, how much amount of the color material is saved to output the color-material saved image.

In the copy machine according to the specific example, the image-information creator 110 is configured so as to employ an image, as a color-material saved image, in which the color material is saved only for a specific type of image (graphic image and image picture) in a plurality of types of images contained in the original image. As explained above, this configuration enables the color-material saved image excellent in readability of the specific type of image to be output.

In the copy machine according to the specific example, the image-information creator 110 is configured so as to determine whether a specific type of image (graphic image and image picture) is contained in the original image and, when the specific type of image is not contained therein, create an image to which information for the notification image, being the image information for color-material saving, is not added even when the saving-status information is the saving ON command indicating that the color material is saved. As explained above, because the specific type of image is not contained in the original image, the image not subjected to color-material saving at all is output, and even in this situation, a person viewing the output image may have a false impression. This configuration enables to avoid the false impression from being given to the person, the false impression being such that the image quality is as high as that of the case in which the color material is not saved although the color material is saved.

In the copy machine according to the detailed example, the image-information creator 110 is configured so as to create information, as the information for the color-material saved image, in such a manner that a specific type of image (object image and image picture) and the notification image are superimposed on each other. In this configuration, even if the specific type of image is difficult to be read because the color-material saving rate is set to a comparatively high value although it is not 100%, the position of the image can be easily recognized.

Further, in the copy machine according to the detailed example, the image-information creator 110 is configured so as to create an image, as the information for the color-material saved image, by adding information formed in such a manner that the notification image and the type notification image are superimposed on each other to a specific type of image. In this configuration, as explained above, even if the type of the image is difficult to be read because the color-material saving rate is set to a comparatively high value although it is not 100%, the type notification image enables the user to easily recognize the type. Furthermore, even if the specific type of image is not output at all because the color-material saving rate is set to 100%, the type notification image enables the user to easily recognize the position where the image is supposed to exist, and the type of the image.

Characteristics of an image processing system according to a second embodiment of the present invention are those as follows. The system is configured to provide a saving mode of color-material consumption, set "dedicated paper" to which information is added in a cassette, the information being used for setting so that an image is output to an output paper (recording paper) by saving color-material consumption, and output a print with the color material of which consumption is saved, using the dedicated paper when an output of the image in the saving mode of the color-material consumption is instructed.

Figure 28:
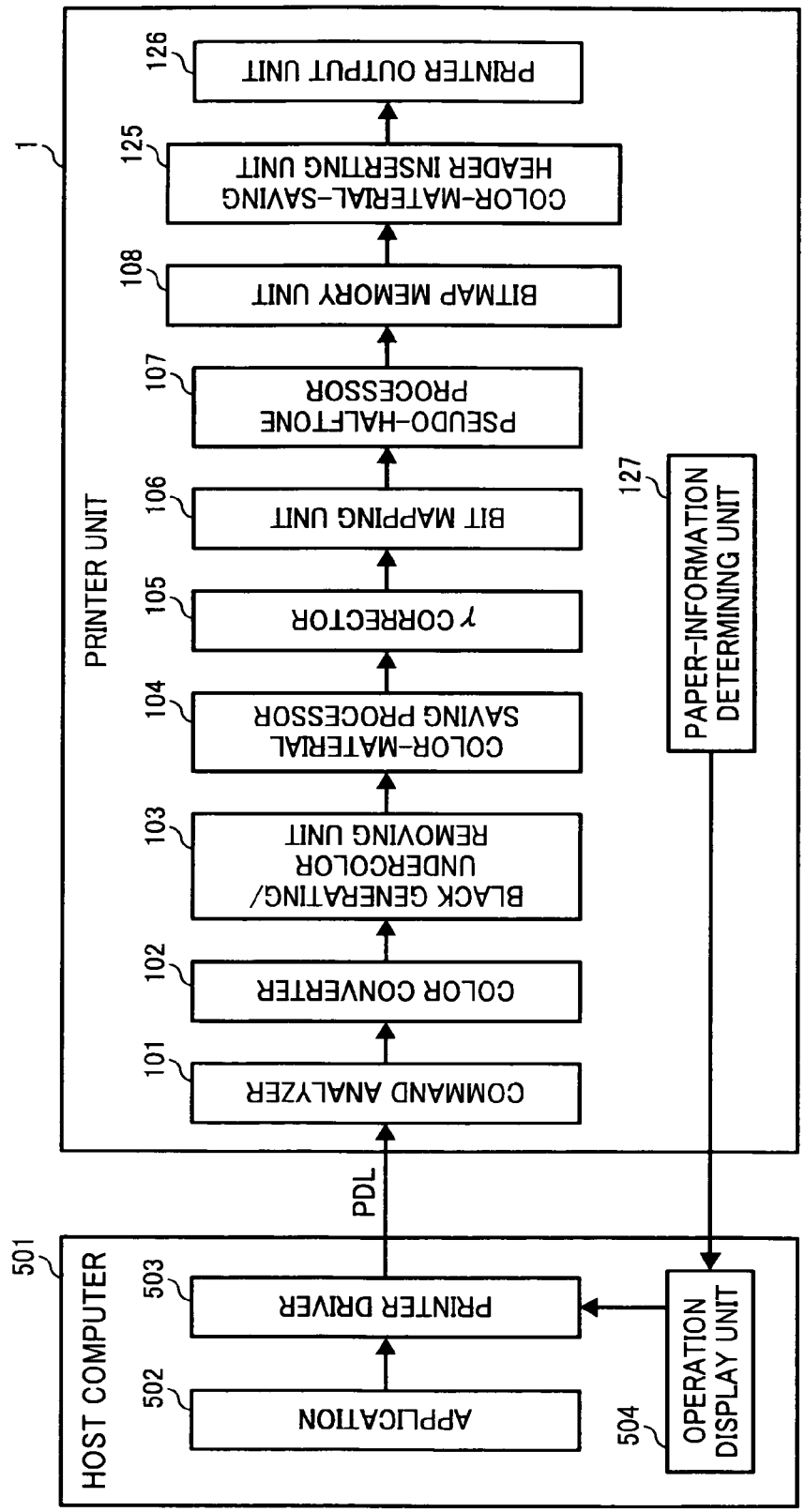
FIG. 28 is a block diagram of a configuration of an image processing system according to a second embodiment of the present invention.
Figure 29:
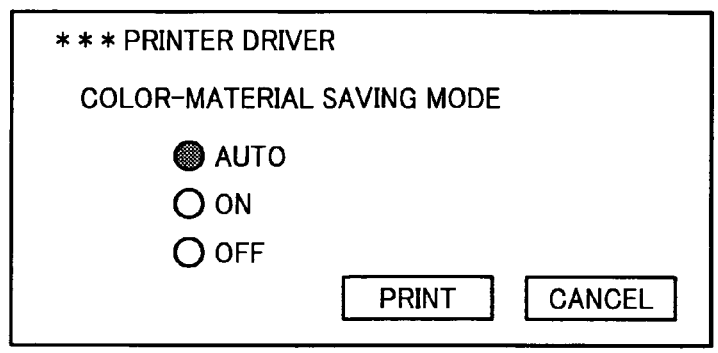
FIG. 29 is a schematic of a setting screen of the color-material saving mode in an operation display unit of FIG. 28.
Figure 30:
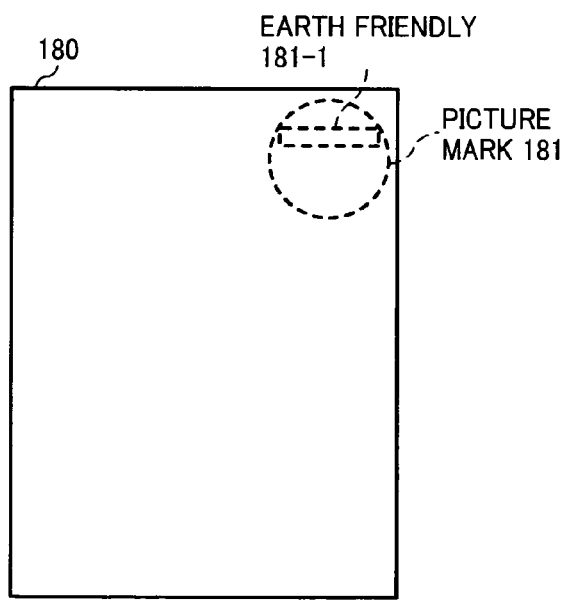
FIG. 30 is a schematic of an example of dedicated paper with a picture mark thereon for the color-material saving mode.
Figure 31:
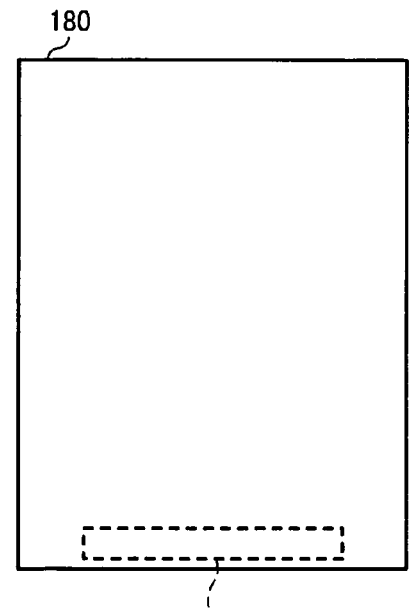
FIG. 31 is a schematic of an example of dedicated paper with a footer thereon for the color-material saving mode.
Figure 32:
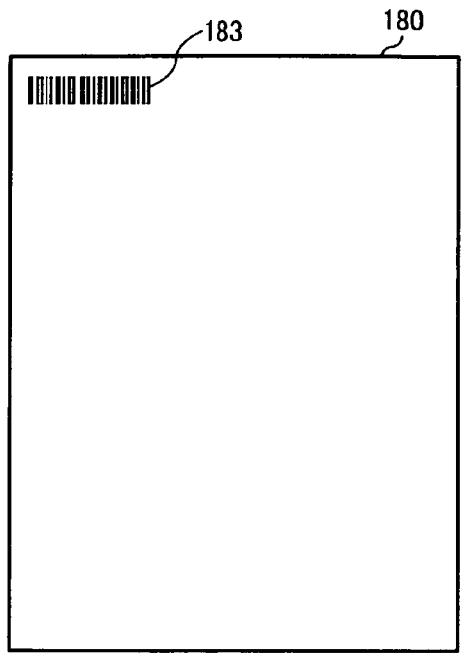
FIG. 32 is a schematic of an example of dedicated paper with a barcode thereon for the color-material saving mode.
Figure 33:
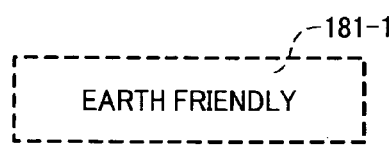
FIG. 33 is an enlarged schematic of a text portion in the picture mark of FIG. 30.
Figure 34:
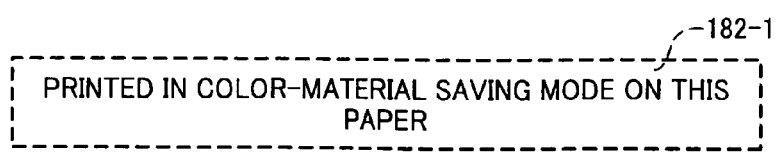
FIG. 34 is an enlarged schematic of a text portion in the footer of FIG. 31.
Figure 35:
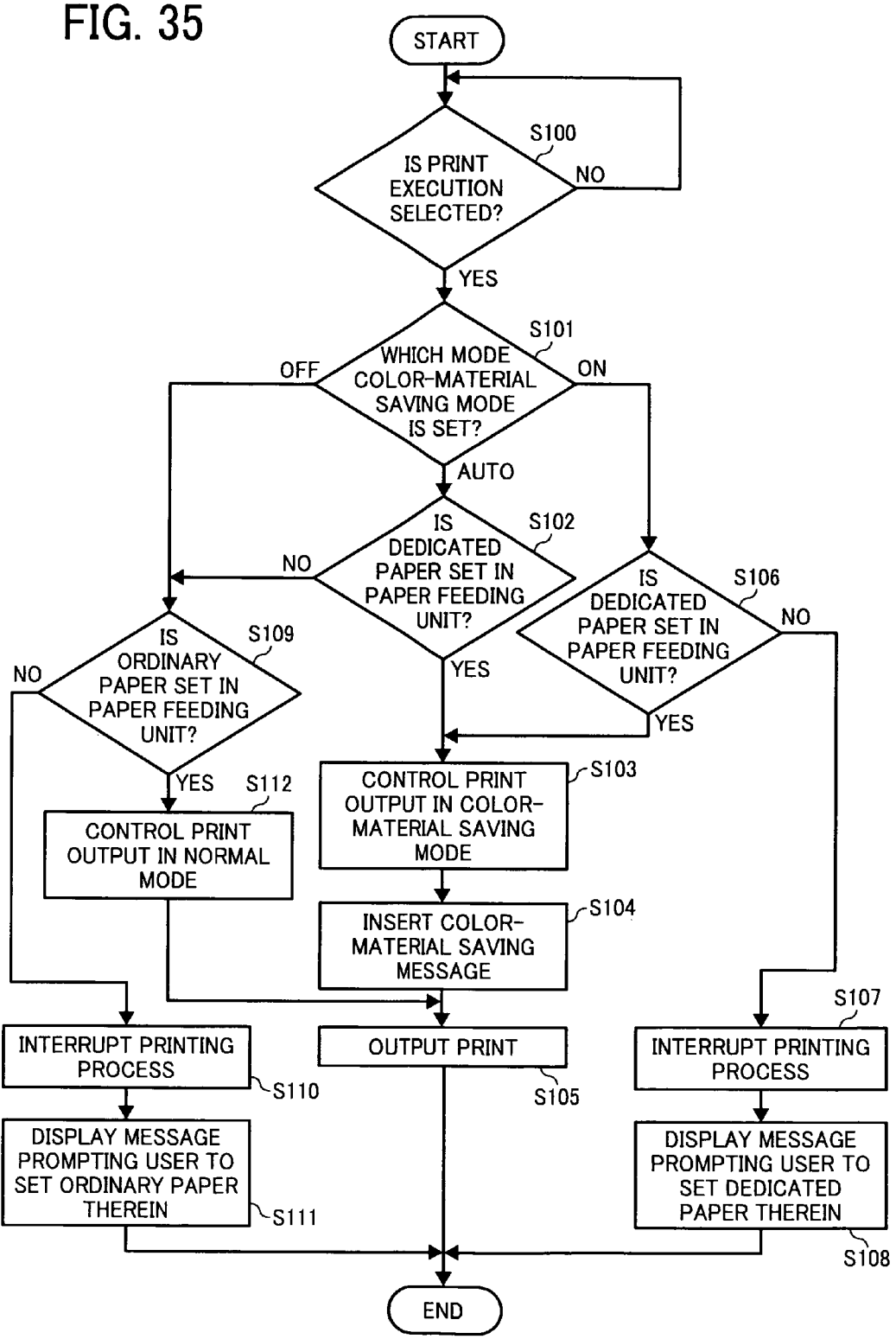
FIG. 35 is a flowchart for explaining an operation of the image processing system according to the second embodiment.

FIG. 28 is a block diagram of a configuration of an image processing system according to the second embodiment. FIG. 29 is a schematic of a setting screen of the color-material saving mode in an operation display unit of FIG. 28. FIG. 30 is a schematic of an example of dedicated paper with a picture mark thereon for the color-material saving mode. FIG. 31 is a schematic of an example of dedicated paper with a footer thereon for the color-material saving mode. FIG. 32 is a schematic of an example of dedicated paper with a barcode thereon for the color-material saving mode. FIG. 33 is an enlarged schematic of a text portion in the picture mark of FIG. 30. FIG. 34 is an enlarged schematic of a text portion in the footer of FIG. 31. FIG. 35 is a flowchart for explaining an operation of the image processing system according to the second embodiment.

The image processing system of FIG. 28 includes a host computer (hereinafter, "host PC") 501 and the printer unit 1 which are connected to each other through a network or offline.

The host PC 501 of FIG. 28 includes an application 502, a printer driver 503, and an operation display unit 504. The application 502 is a document creation application for creating and printing a document. The printer driver 503 converts the document created by the application 502 to data (e.g., PDL: page description language) that the printer unit 1 can interpret. The operation display unit 504 is assumed that a display unit (liquid crystal display (LCD)) for displaying a setting status and an operation screen or the like of the host PC

501 and an operating unit (touch panel) through which an input operation is performed following the display content are integrally formed into one unit, however, they may be discretely formed.

The printer unit 1 of FIG. 28 includes the command analyzer 101, the color converter 102, the black generating/undercolor removing unit 103, the color-material saving processor 104, the γ corrector 105, the bit mapping unit 106, the pseudo-halftone processor 107, the bitmap memory unit 108, a color-material-saving header inserting unit 125, a printer output unit 126, and a paper-information determining unit 127 being a paper-information reading unit.

The command analyzer 101 interprets PDL data converted by the printer driver 503, and acquires object information (text/graphic/image), a position and size of the object, color or monochrome, signal values (K or RGB values), and information for font or the like if text, as drawing commands. The command analyzer 101 also acquires information as to whether a characteristic color-material saving mode in the second embodiment is set to ON or OFF.

The color converter 102 and the black generating/undercolor removing unit 103 convert RGB, when the object is color, to CMYK being color signals corresponding to color materials. Specifically, the color converter 102 converts RGB to C'M'Y', and the black generating/undercolor removing unit 103 converts C'M'Y' to CMYK.

Figure 6:
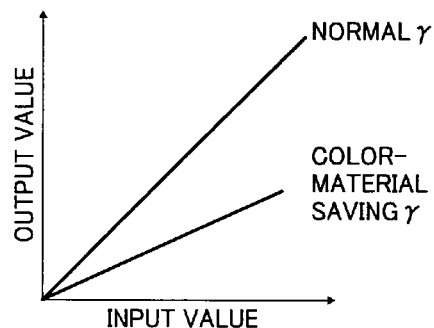
FIG. 6 is a graph of input-output characteristics used by a color-material saving processor provided in the image processing apparatus of the printer unit in FIG. 4.

The color-material saving processor 104 converts values of CMYK using the conversion table of FIG. 6 when the color-material saving mode is set. For example, when the color-material saving mode is set to OFF, the values are converted using the normal γ shown in FIG. 6 (no real conversion). When the color-material saving mode is set to ON, the values are converted using the color-material saving γ shown in FIG. 6. The color-material saving γ is prepared by multiplying the normal γ by a coefficient preset to a value less than 1.

The γ corrector 105 performs conversion using a γ-conversion table to correct γ characteristics of the printer. Here, the correction is performed using the printer γ-correction table shown in FIG. 7.

The bit mapping unit 106 decompresses the drawing command to a bitmap image to generate the bitmap image.

The pseudo-halftone processor 107 reduces the number of bits and performs the pseudo-halftone process for expressing the density with area gradation using a plurality of dots. Here, the dither process is performed so as to convert 8-bit CMYK images to 2-bit CMYK images.

The bitmap memory unit 108 is a memory that stores the bitmap image for one page after being subjected to the dither process by the pseudo-halftone processor 107.

The color-material-saving header inserting unit 125 inserts a fixed phrase, indicating that the image is output in the color-material saving mode, in the header of the image when the color-material saving mode is set to Auto or ON and the dedicated paper is set in the paper feeding cassette. The fixed phrase to be inserted is prepared beforehand in a form of a bitmap image. A position in which the fixed phrase is inserted is not limited to the header but may be the footer and any other predetermined position. However, explanation is made here based on the header as the position.

The printer output unit 126 puts color materials on the paper and outputs an image based on the image data subjected to the dither process by the pseudo-halftone processor 107 and inserted in the header for the color-material saving by the color-material-saving header inserting unit 125.

The paper-information determining unit 127 reads information from the dedicated paper to which the information indicating that an image is output in the saving mode of the color-material consumption is added, and determines the content of the information. For example, a barcode reader (not shown) is attached to each of the paper feeding cassettes 202 and 203 in the paper feeding device 200 provided in the lower part of the printer unit 1 of FIG. 1 so as to read a barcode added to the dedicated paper, and it is possible to determine paper information by reading a barcode 183 described on the upper left side of an output paper 180 shown in FIG. 32. The user depresses a print button (see FIG. 29) in the operation display unit 504 of the host PC 501, and the barcode reader recognizes the barcode that the dedicated paper for the color-material saving is set therein and transmits the result of recognition to the host PC 501 where an output process is controlled so as to perform the color-material saving process. As explained above, the barcode reader being the paper-information determining unit 127 is attached to each of the paper feeding cassettes 202 and 203 in the paper feeding device 200 shown in FIG. 1. As the technology for reading the barcode 183 added to the output paper 180 and transmitting a signal indicating the read barcode, a printer system described in Japanese Patent Application Laid-open No. 2004-160743 or the like can be used.

Another configuration of the paper-information determining unit 127 may be one that reads, when information is written in text at a predetermined position of dedicated paper, the text by optical character recognition (OCR) and directly recognizes the content of the information. For example, as shown in FIGS. 31 and 34, when a character string 182-1 "Printed in color-material saving mode on this paper" is inserted in a lowest part or a footer 182 of the output paper 180, the character string is read by a dedicated scanner, and a meaning of the character string 182-1 in FIG. 34 is determined by the OCR. As a simpler configuration of the above example, a predetermined area in which the character string is supposed to be written is imaged, a black pixel density in the area is calculated, and if it is determined by performing a threshold process that any text is written, it is possible to determine that the dedicated paper is stored in the cassette without finding out the meaning of the text.

Still another example of the paper-information determining unit 127 may be configured to embed a radio frequency identification (RFID) tag in printer paper instead of addition of the barcode thereto and read information of the tag using an RFID reader/writer. By printing the barcode also on the back of the paper, apparent redundancy on the paper can be significantly reduced. For example, an image forming system described in Japanese Patent Application Laid-open No. 2004-249499 proposes a system device. Specifically, when printer paper with an RFID tag embedded therein is output as a print and the print is used as an original, the system device recognizes the original as a generation original. The second embodiment uses the RFID reader/writer that reads information for the RFID tag as one example of the paper-information determining unit 127, and specifically uses this reader/writer to determine whether paper is dedicated paper for setting the saving mode of the color-material consumption.

Still another example of the paper-information determining unit 127 is such that a part of dedicated paper (e.g., upper right corner thereof) is cut and a dedicated paper feeding cassette is prepared so as to store therein only the paper in the above shape. Then, it is determined whether the dedicated paper feeding cassette is attached to the printer unit 1. For example, by using a mechanism capable of attaching the dedicated paper feeding cassette only to a specific location, it is possible to easily determine whether the dedicated paper feeding cassette is attached thereto.

Subsequently, dedicated output paper (dedicated paper) for outputting an image in the saving mode of the color-material consumption used in the second embodiment, and a paper feeding cassette for storing the paper and its periphery will be explained below. First, as shown in FIG. 30, text and a picture (picture mark 181) are printed on the output paper 180 so that the user can recognize so-called Ecology Specifications indicating environment-friendly specifications achieved by saving the color-material consumption. When an analyzer is provided so as to directly read the text by the OCR, the text on the picture mark 181 needs to be printed using a little bit darker color, to effectively appeal for ecology, although the picture mark may be a print like a pale watermark.

As shown in FIGS. 30 and 33, the picture mark 181 (Eco Mark: environmental labeling or the like managed by Japan Environment Association) including a character string 181-1 "Earth friendly" is printed at the upper right side of the output paper 180 so as to appeal for ecology specifications and enable the user to understand from the paper that the saving mode is recommended. As shown in FIGS. 31 and 34, the character string 182-1 "Printed in color-material saving mode on this paper" as the footer 182 is inserted in the lowest part of the output paper 180. Moreover, as shown in FIG. 32, the barcode 183 is printed at an appropriate position (here, upper left side) of the output paper 180 so that the user can recognize that the paper is the dedicated paper.

As explained above, the present invention uses a sheet of paper with at least one of the mark, the character string, and the barcode thereon as dedicated paper. The paper feeding cassette with the dedicated paper set therein is prepared and a paper feeding cassette with ordinary paper set therein is also prepared for the case where OFF of the color-material saving mode is selected.

It is noted that the example of using the Eco Mark by Japan Environment Association is shown as the picture mark in FIG. 30, however, Blue Angel Mark by Germany's Federal Environment Agency or any other picture mark specified by a business field or a company can be used.

Next, the operation of the image processing system according to the second embodiment will be explained below using a flowchart of FIG. 35. Here, it is assumed that an Auto mode is initially set by the user so as to give priority to the color-material saving mode according to the gist of the second embodiment, and that information set in the dedicated paper is loaded into the host PC 501 and, as a result, the mode is set so that the color-material saving mode is set to ON.

First, the user uses the application 502 to create a document on the host PC 501 of FIG. 28, and then, depresses the print button in the operation display unit shown in FIG. 29, so that print execution is selected (Step S100). The printer driver 503 converts the created document data to data (PDL) that the printer unit 1 can interpret, and transmits the converted data to the printer unit 1.

At Step S100, the user selects the print execution, and a menu of the printer driver as shown in FIG. 29 is displayed on the screen of the host PC 501. The user can select whether the color-material saving mode is set to ON or OFF. The printer driver 503 describes that the setting of the color-material saving mode is ON, OFF, or Auto (color-material saving mode is prioritized) in the converted PDL (Step S101).

At Step S101, when Auto is set, the mode is set based on prepared paper information. For example, when the printer unit 1 prepares both the cassette with ordinary paper set therein and the cassette with the dedicated paper, indicating recommendation of the saving mode, set therein (YES at Step S102), an image process for the saving mode is subjected to an image, and control of selecting dedicated paper and printing out the paper is selected. The same process is also performed on the case in which only the cassette with the dedicated paper set therein is prepared (YES at Step S102).

When the Auto in which the color-material saving mode is prioritized is set as shown in FIG. 29 (Step S101) and the dedicated paper is set in the paper feeding cassette (Step S102), it may be configured so that the user can set, on the printer driver 503 through the operation display unit 504, whether to confirm the user whether an image is surely output in the color-material saving mode, or to print the image totally in the Auto mode without the confirmation.

In the case of the former setting in which the confirmation is made to the user, it may be configured, although it is not shown in FIG. 35, so that the following control may be selected, the control being such that, before the process for the saving mode is started, a message of the content "Printed in the color-material saving mode. Is that OK?" is displayed on the operation display unit 504 of the host PC 501 to prompt the user to select YES or NO, the process for the saving mode is subjected to the image only in the case of YES, and the image is printed out.

As explained above, when the user selects YES or when the latter setting is selected so that an image is printed totally in the Auto mode without confirmation to the user, the process shifts to Step S103 where print output is controlled in the color-material saving mode.

In the second embodiment, when the character string 182-1 "Printed in the color-material saving mode on this paper" is previously included in the footer 182 of the output paper as shown in FIGS. 31 and 34, the same information does not need to be inserted in the header. However, when such a character string is not previously inserted therein or when some other information is further added thereto such as "Color material is processed by a certain percent decrease", it is important that the color-material-saving header inserting unit 125 in the printer unit 1 of FIG. 28 prints a color-material saving message in a predetermined format on the paper (Step S104).

Further, to confirm that Auto as the color-material saving mode is set at Step S101 and to confirm whether an image is surely printed in the color-material saving mode (whether the user selects YES when it is confirmed to the user whether the image is printed in the color-material saving mode) at Step S102 although the dedicated paper is set in the paper feeding cassette, it is important to print a color-material saving message on the dedicated paper (Step S104).

As explained above, the output paper 180 output from the printer output unit 126 when the color-material saving mode is set to ON (Step S105) is the one as shown in FIG. 10. That is, the output paper 180 output from the printer output unit 126 when the color-material saving mode is set to OFF (Step S112) is the one as shown in FIG. 8. Therefore, by comparing the both of them, it is understood that the consumptions of color materials are suppressed and respective densities become low in the text portion, the graphic portion, and the image portion respectively when the color-material saving mode is ON (FIG. 10). Furthermore, in FIG. 10, the notification image (header) 600 indicating that the image is output in the color-material saving mode is printed. FIG. 9 shows an example of a character string 600-1 in the header 600 such as "Output in the color-material saving mode".

At Step S101 in FIG. 35, when the dedicated paper recommending the saving mode is not set in the cassette (NO at Step S106) even if the color-material saving mode is set to ON, it is possible to interrupt the printing process (Step S107) and then display a massage prompting the user to set the dedicated paper therein on the operation display unit 504 (Step S108).

On the other hand, at Step S101, when the color-material saving mode is set to OFF and only the dedicated paper is prepared (NO at Step S109), it is also possible to interrupt the printing process (Step S110) and then a massage prompting the user to set the ordinary paper in the cassette is displayed thereon (Step S111). At Step S110, it is also possible to arbitrarily set the process flow of controlling so as to print an image in the saving mode process without interrupting the printing process, according to user's desire.

As explained above, according to the second embodiment, when the color-material saving mode is set and an image is printed out, the image is printed on the dedicated paper with the picture and the fixed phrase indicating that the image is output in the color-material saving mode inserted in a predetermined position of the paper. Therefore, the notification that the image is output in the color-material saving mode can be clearly shown to the user or the person in a distributed destination. Thus, although printing is performed with the reduced density, the false impression is given to the user or to some other person about "low device performance", but this false impression can be eliminated, and it is possible to externally present contribution to environmental improvement by outputting the image in the color-material saving mode. The information corresponding to "Ecology" added to the output paper is a visible picture (including a picture mark and a barcode) and a visible character string, and it is therefore possible to comparatively easily determine whether the information corresponding to "Ecology" is added to the paper set in the paper feeding cassette. Particularly, the picture and the character string are highly visible, and thus, when the user sets the paper in the paper feeding cassette, it is possible to prevent the paper from happening to set ordinary paper therein. Besides, the picture and the like are effective as information which enables the user to clearly recognize that the image is output in the color-material saving mode.

According to the second embodiment, by employing the system configuration, the paper feeding cassette with the dedicated paper set therein is only attached to the system, which enables to let the user of a print know the presence of the color-material saving mode and also enables the user to prevent a case that may cause a faulty operation for the color-material saving mode.

In the second embodiment, as shown in FIGS. 30 and 33, by devising means of improving the favorable public image of the user who uses the output paper by printing a character string of "Our company aspires to earth-friendly enterprise" near the picture mark in addition to the picture mark of "Earth friendly", the charge for this device may be added to the paper cost and collected from the user. Moreover, by altering the portion of "Our company" to a specific company name that gives its approval to environmental improvement, the charge corresponding to the improved image of the company can be collected.

In the second embodiment, as an example of the saving mode of the color-material consumption, effects to environment are aimed by saving the amount of color materials to be used, however, characteristics of a third embodiment of the present invention are aimed to achieve effects to environment by limiting the number of colors used for reproduction.

As a specific example, when a one-drum printer device is used, to reproduce an image with four colors of CMYK, it is necessary to rotate the drum four times to form the image. However, by reproducing the image with two colors, the operations used for image reproduction can be largely omitted, which can be obviously contributed to energy saving.

Moreover, if an image is reproduced with a smaller number of colors than four colors regardless of the one-drum printer device, this can be expected to give the photosensitive drum and the other components respective longer lives. Further, some other printer includes colors more than the four colors including a light-color material and a custom color. In this case, generally, the light-color material and the custom color are often higher in manufacturing costs as compared with ordinary color materials, and thus, if these colors are not used more than necessity, then an advantageous effect can be expected in terms of both aspects of environment and running costs for the user.

In the third embodiment, an example of printing in two colors of black and any one of red, green, and blue will be explained below.

Figure 36:
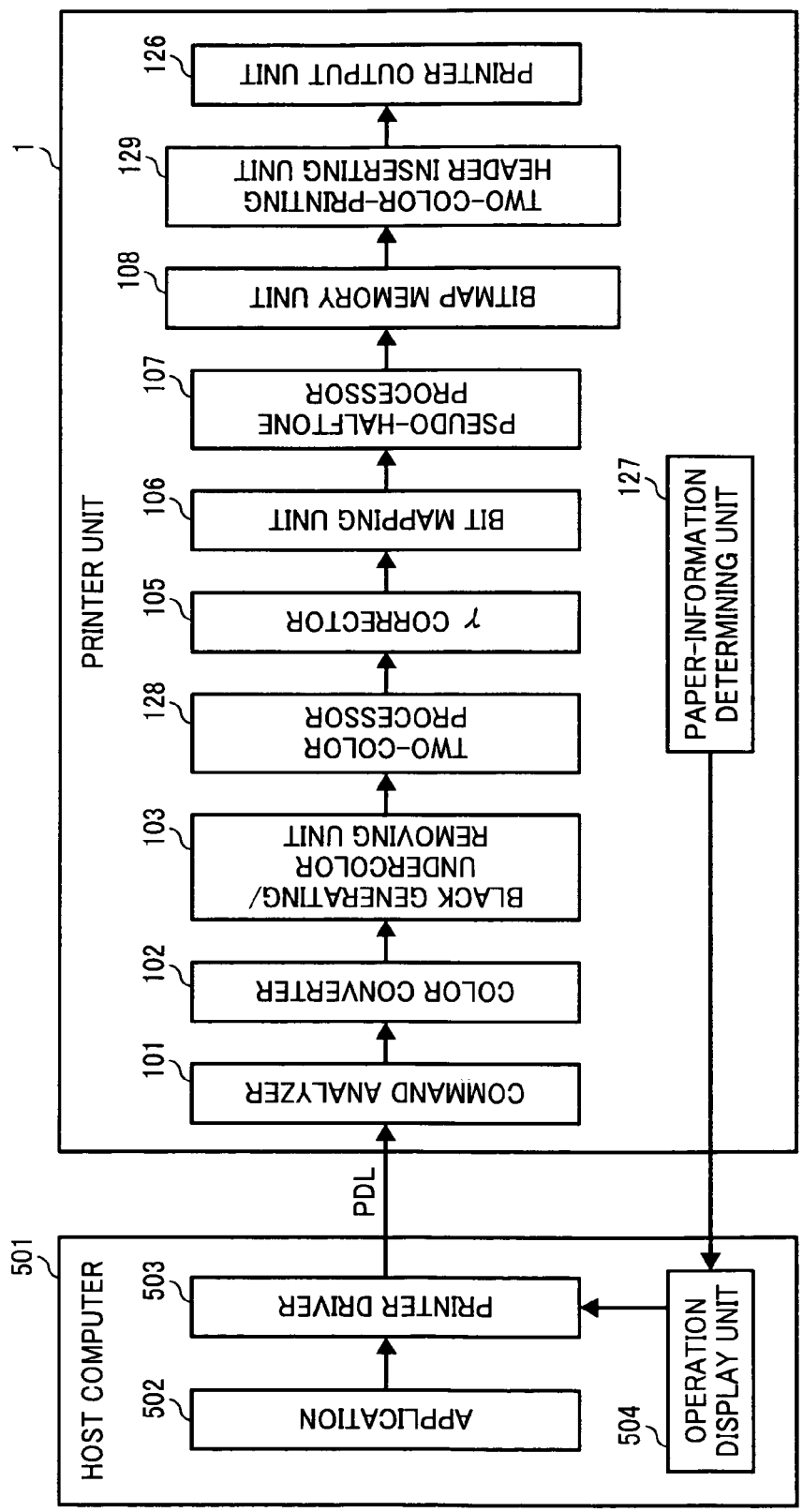
FIG. 36 is a block diagram of a configuration of an image processing system according to a third embodiment of the present invention.
Figure 37:
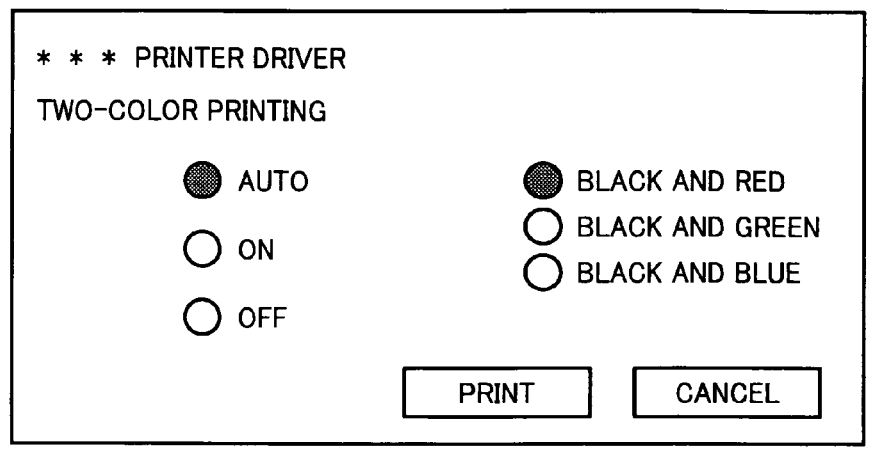
FIG. 37 is a schematic of a setting screen of a two-color printing mode in an operation display unit of FIG. 36.
Figure 38:
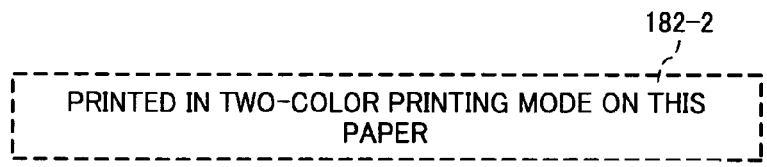
FIG. 38 is an enlarged schematic of another text portion in the footer of FIG. 31.
Figure 39:
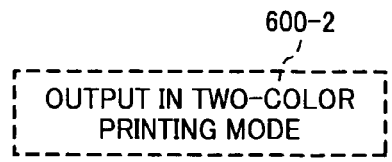
FIG. 39 is an enlarged schematic of another text portion in the header of FIG. 10.

FIG. 36 is a block diagram of a configuration of an image processing system according to the third embodiment, and FIG. 37 is a schematic of a setting screen of a two-color printing mode in an operation display unit of FIG. 36. FIG. 38 is an enlarged schematic of another text portion in the footer of FIG. 31, and FIG. 39 is an enlarged schematic of another text portion in the header of FIG. 10.

A basic configuration of the image processing system shown in FIG. 36 is nearly the same as that of FIG. 28, however, part of the characteristic portion thereof is different from that of FIG. 28, and thus, the configuration of the related portion is explained in a different manner. Here, a portion of the characteristic configuration of the third embodiment is mainly explained, and explanation of the same portions as these of FIG. 28 is omitted.

First, in FIG. 36, a two-color processor 128 and a two-color-printing header inserting unit 129 are different from these of FIG. 28. Therefore, each content of image processes in the command analyzer 101, the color converter 102, the black generating/undercolor removing unit 103, and the color-material saving processor 104 is also different from that of FIG. 28.

The command analyzer 101 interprets the PDL data converted by the printer driver 503, and acquires information as to whether a two-color printing mode is set to ON or OFF and which of the colors is used to perform the two-color printing, in addition to the object information (text/graphic/image). Here, as shown in FIG. 37, it is assumed that the Auto mode is initially set by the user so as to give priority to the two-color printing mode according to the gist of the third embodiment. The print button is depressed, printing is executed, and then the information set in the dedicated paper is read by the paper-information determining unit 127 and is transmitted to the host PC 501. Thus, setting is performed so that the two-color printing mode is set to ON.

When the object is color, the color converter 102 and the black generating/undercolor removing unit 103 convert RGB to CMYK being color signals corresponding to color materials. Specifically, the color converter 102 converts RGB to C'M'Y', and the black generating/undercolor removing unit 103 converts C'M'Y' to CMYK. When the two-color printing mode is set to ON, the black generating/undercolor removing process is performed so as to replace the colors with 100% K.

Black generating/undercolor removing process in two-color printing mode:

$K = \min(C', M', Y)$ $C = C' - K$ $M = M' - K$ $Y = Y' - K$

When the object is not originally RGB, i.e. monochrome and a value of monochrome (Gray) is specified, C=M=Y=0 and K=Gray are output.

When the object is color and the two-color printing mode is set to ON, the two-color processor 128 calculates a density $X2$ of Red or Green or Blue and a density $K2$ of Black using the following equations.

Two-color process in two-color printing of Black and Red-(1):

$$X2=(3M+Y)/4$$

$$K2=K+C$$

Two-color process in two-color printing of Black and Green-(1):

$$X2=(C+Y)/2$$

$$K2=K+M$$

Two-color process in two-color printing of Black and Blue-(1):

$$X2=(3C+M)/4$$

$$K2=K+Y$$

When the two-color printing of Black and Red is performed, M and Y are weighted upon calculation of the density $X2$ and are summed, and the two colors are converted to Red mainly between hues of Red and Magenta. The case of the two-color printing of Black and Blue is also the same as above, C and M are weighted upon calculation of the density $X2$ and are summed, and the two colors are converted to Blue mainly between hues of Blue and Cyan.

A subtractive color process is performed by inputting a value of $X2$ in two colors to be used from among CMY and setting a remaining one color component to zero. When Red is specified in the two-color printing, then Magenta (M2) and Yellow (Y2) are used as the two colors, when Green is specified, then Cyan (C2) and Yellow (Y2), and when Blue is specified, then Cyan (C2) and Magenta (M2).

Two-color process in two-color printing of Black and Red-(2):

$$C2=0$$

$$M2=X2$$

$$Y2=X2$$

Two-color process in two-color printing of Black and Green-(2):

$$C2=X2$$

$$M2=0$$

$$Y2=X2$$

Two-color process in two-color printing of Black and Blue-(2):

$$C2=X2$$

$$M2=X2$$

$$Y2=0$$

When the object is monochrome or when the two-color printing mode is set to OFF, then C2=C, M2=M, Y2=Y, and K2=K are output.

When the two-color printing mode is set to ON, the two-color-printing header inserting unit 129 inserts a fixed phrase indicating that an image is output in the two-color printing mode in the header of the image. The fixed phrase to be inserted is prepared in a form of a bitmap image. For example, a character string 600-2 "Output in two-color printing mode" as shown in FIG. 39 is one example of fixed phrases and is inserted in the header 600 of FIG. 10.

The dedicated output paper 180 used in the third embodiment is nearly the same as these of the second embodiment shown in FIGS. 30 to 32. However, text to be printed in the footer 182 of FIG. 31 is a character string 182-2 "Printed in two-color printing mode on this paper" shown in FIG. 38. Therefore, when the character string 182-2 is previously printed therein, the similar information to this does not need to be inserted in the header 600, however, if this type of character string is not inserted in the footer 182, then it is particularly important to insert this in the header 600.

Furthermore, when the Auto mode is set through the operation display unit shown in FIG. 37 so as to give priority to the two-color printing mode and the dedicated paper is set in the paper feeding cassette, the character string 182-2 becomes an effective indication in terms of checking whether two-color printing is surely performed. For example, when setting is provided so as to start printing after confirmation is made to the user whether the printing may be performed in the two-color printing mode, then the indication enables to confirm that the user selects YES.

Next, the operation of the image processing system according to the third embodiment will be explained below. As shown in FIG. 37, setting is performed so that the Auto mode is initially set by the user so as to give priority to the two-color printing mode, the print button is depressed, printing is executed, and then the information set in the dedicated paper is read by the paper-information determining unit 127 and is transmitted to the host PC 501, so that the two-color printing mode is set to ON. The operational flow of the third embodiment can be explained by referring to the flowchart of FIG. 35 according to the second embodiment and by replacing "color-material saving mode" with "two-color printing mode" and replacing "color-material saving message" with "two-color printing message".

First, the user uses the application 502 to create a document on the host PC 501 of FIG. 36, and then, depresses the print button in the operation display unit shown in FIG. 37, so that print execution is selected (see Step S100). Then, the printer driver 503 converts the created document data to data (PDL) that the printer unit 1 can interpret, and transmits the converted data to the printer unit 1.

When the user selects the print execution (see Step S100), a menu of the printer driver as shown in FIG. 37 is displayed on the screen of the host PC 501. The user can select whether the two-color printing mode is set to ON or OFF, and further select two colors from among Black and Red, Black and Green, and Black and Blue, with which the two-color printing is performed. The default is set to Black and Red. The printer driver 503 describes that the setting of the two-color printing mode is ON, OFF, or Auto (two-color printing mode is prioritized) mode in the converted PDL (see Step S101). Furthermore, the printer driver 503 also describes with which colors the two-color printing is performed, in the PDL.

Here, if the Auto mode is set (see Step S101), then the mode is set based on prepared paper information. For example, when both the cassette with ordinary paper set therein and the cassette with the dedicated paper, which recommends the two-color printing, set therein are prepared in the printer unit 1 (see YES at Step S102), an image process for the two-color printing mode is subjected to an image, and the control of selecting dedicated paper and printing out the image is selected. The same process is performed on the case of preparing only the cassette with the dedicated paper set therein (see YES at Step S102).

As explained above, when the Auto mode is set so as to give priority to the two-color printing mode (see Step S101) and the dedicated paper is set in the paper feeding cassette (see Step S102), it may be configured so that the user can set, on the printer driver 503 through the operation display unit 504, whether to confirm the user whether an image is surely output in the two-color printing mode or to print the image totally in the Auto mode without the confirmation.

In the case of the former setting in which the confirmation is made to the user, it may be configured so that the following control may be selected, the control being such that, before the process for the two-color printing is started, a message of the content "Printed in the two-color printing mode. Is that OK?" is displayed on the operation display unit 504 of the host PC 501 to prompt the user to select YES or NO, the process for the two-color printing is subjected to the image only in the case of YES, and the image is printed out.

As explained above, when the user selects YES or when the latter setting is selected so that an image is printed totally in the Auto mode without confirmation to the user, print output is controlled in the two-color printing mode (see Step S103).

In the third embodiment, as shown in FIG. 38, when the character string 182-2 "Printed in two-color printing mode on this paper" is previously inserted in the footer of the output paper, there is no need to insert the similar information in the header. However, when such a character string is not inserted therein, it is important to print the color-material saving message on the paper in a predetermined format by the two-color-printing header inserting unit 129 in the printer unit 1 of FIG. 36 (see Step S104).

When the Auto mode as the color-material saving mode is set (see Step S101) and the dedicated paper is set in the paper feeding cassette (see Step S102), it is important to print the two-color printing message for confirming whether an image is surely printed in the two-color printing mode (whether the user selects YES when the confirmation is made to the user whether the image may be printed in the two-color printing mode) (see Step S104).

As explained above, when the two-color printing mode is set to ON and the dedicated paper is set in the cassette, the image is printed out in two colors from the printer output unit 126.

When the color-material saving mode is set to ON (see Step S101) and the dedicated paper recommending the two-color printing mode is not set in the cassette (NO at Step S106), it is also possible to interrupt the printing process (see Step S107), and then, display the message prompting the user to set the dedicated paper therein on the operation display unit 504 (see Step S108).

On the other hand, when the two-color printing mode is set to OFF (see Step S101) and when only the dedicated paper is set therein (NO at Step S109), it is also possible to interrupt the printing process (see Step S110) and display a message prompting the user to set the ordinary paper therein (see Step S111). Furthermore, it is also possible to arbitrarily set the process flow, according to user's desire, so as to print an image in the two-color printing mode without interrupting the printing process at Step S110.

As explained above, according to the third embodiment, when the mode of reproducing an image with a small number of colors such as the two-color printing is set, an image is printed on the paper in which a picture image and a fixed phrase indicating that the image is output in the mode of reproducing it with a smaller number of colors is inserted in a predetermined position of the image. Therefore, the notification that the image is output in the above mode can be clearly shown to the user or to the person in a distributed destination. Even if degradation occurs in such a manner that an originally provided color difference between adjacent pixels decreases due to the two-color printing and that a connected part between portions where hues change is not smoothly reproduced, a false impression given to the user about the performance of the device is eliminated, and the contribution to environmental improvement can be externally shown by outputting the image in the two-color printing mode.

In addition, according to the third embodiment, by employing the system configuration, the paper feeding cassette with the dedicated paper set therein is only attached to the system, which enables to let the user of a print know the presence of the mode of reproducing an image with a smaller number of colors and also enables the user to prevent a case that may cause a faulty operation for the two-color printing mode.

The second and the third embodiments explain the present invention using the printer connected to the host PC. In a fourth embodiment of the present invention, the present invention is applied to a copy machine.

Figure 40:
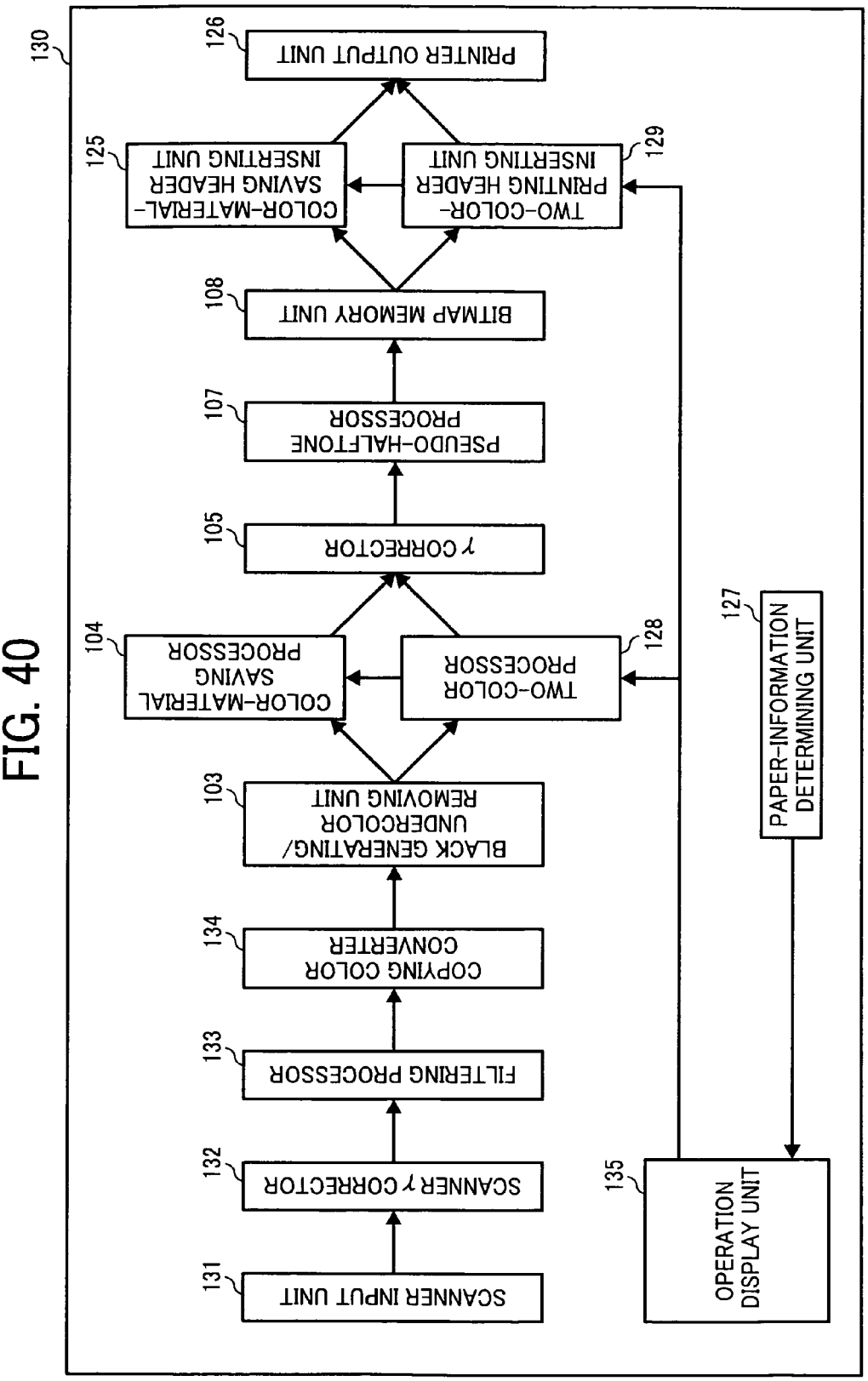
FIG. 40 is a block diagram of a configuration of an image processing apparatus according to a fourth embodiment of the present invention.

FIG. 40 is a block diagram of a configuration of an image processing apparatus according to the fourth embodiment. A copy machine 130 of FIG. 40 includes a scanner input unit 131, a scanner γ corrector 132, a filtering processor 133, a copying color converter 134, which are newly added to the configuration, and it is also configured to select either one of a combination between the color-material saving processor 104 and the color-material-saving header inserting unit 125 according to the second embodiment and a combination between the two-color processor 128 and the two-color-printing header inserting unit 129 according to the third embodiment.

An operation display unit 135 of the copy machine 130 is configured so that the user can set the color-material saving mode or the two-color printing mode from a menu displayed on the operation display unit 135. For example, the setting screen of the color-material saving mode is the same as that of FIG. 29, and the user can set the mode by selecting one from among ON and OFF of the color-material saving mode and the Auto mode in which priority is given to the color-material saving mode. When the Auto mode is set, the mode is set according to the paper set in the paper feeding cassette based on the information determined by the paper-information determining unit 127, and the set mode is displayed on the operation display unit 135. The operation performed when the color-material saving mode is set is the same as that of the second embodiment, and thus explanation thereof is omitted.

Furthermore, the setting screen of the two-color printing mode is the same as that of FIG. 37, and the operation mode is also the same as that of the third embodiment, and thus explanation thereof is omitted.

The scanner input unit 131 irradiates an original on the copy machine 130 with a beam to read RGB signals. The read RGB signals are dependent on the characteristics of the scanner. The scanner γ corrector 132 corrects a γ characteristic of the scanner and performs conversion using the γ-conversion table.

The filtering processor 133 performs a filtering process for enhancement of correcting a modulation transfer function (MTF) characteristic of the scanner input unit 131 to sharpen a character, and a filtering process for smoothing to minimize moire produced due to interference between a halftone original and the pseudo-halftone processor 107 for output.

The copying color converter 134 converts the RGB signals that are dependent on the characteristics of the scanner input unit 131 to CMYK signals that are color signals corresponding to the color materials.

The rest of the components of FIG. 40 are the same as these in the printer unit 1 of FIG. 28 and FIG. 36, and thus explanation thereof is omitted. The fourth embodiment is configured to select ON/OFF of the color-material saving mode set by the paper-information determining unit 127 through the operation display unit 135 of the copy machine 130 or to select either one of a combination between the color-material saving processor 104 and the color-material-saving header inserting unit 125 and a combination between the two-color processor 128 and the two-color-printing header inserting unit 129, according to ON/OFF of the two-color printing mode, perform image processing on an image input through the scanner, and output the image from the printer output unit 126.

The processes in the black generating/undercolor removing unit 103 to the γ corrector 105 in the printer unit 1 are performed object by object, however, the processes in the copy machine 130 are performed pixel by pixel.

As explained above, according to the fourth embodiment, even when the present invention is applied to the copy machine, by setting either one of the color-material saving mode and the two-color printing mode in which reproduction is performed using a smaller number of colors, an image is printed on the paper in which the picture image and the fixed phrase indicating that the image is output in the respective modes are inserted in predetermined positions of the image. Therefore, the notification that the image is output in the color-material saving mode or in the two-color printing mode can be clearly shown to the user or to the person in a distributed destination. This eliminates the false impression given to the user or the like about the performance of the device, lets the user know the presence of these mode, and also enables the user knowing the presence thereof to prevent the case that may cause the faulty operation.

Programs executed in the image processing system and the image processing apparatus according to the second to the fourth embodiments are provided by being previously stored in a read only memory (ROM) or the like (not shown) in the host PC 501, the printer unit 1, or the copy machine 130.

Moreover, the programs executed in the image processing system and the image processing apparatus according to the first to the fourth embodiments may be provided by being recorded in a computer-readable recording medium such as a CD-ROM, a flexible disk (FD), a compact disk recordable (CD-R), and a digital versatile disk (DVD) in an installable or executable format file.

Furthermore, the programs executed in the image processing system and the image processing apparatus according to the first to the fourth embodiments may be provided by storing them on a computer connected to a network such as the Internet and downloading them through the network. The programs executed in the image processing system and the image processing apparatus according to the first to the fourth embodiments may also be provided or distributed through a network such as the Internet.

The programs executed in the image processing system and the image processing apparatus according to the first to the fourth embodiments are formed with modules including the components (operation display unit 504, color-material saving processor 104, two-color processor 128, color-material-saving header inserting unit 125, two-color-printing header inserting unit 129, paper-information determining unit 127, and operation display unit 135). Actual hardware is obtained in such a manner that a central processing unit (CPU) (processor, not shown) reads the respective programs from the ROM and executes them, to load the components on a main storage device, so that the operation display unit 504, the color-material saving processor 104, the two-color processor 128, the color-material-saving header inserting unit 125, the two-color-printing header inserting unit 129, the paper-information determining unit 127, and the operation display unit 135 are generated on the main storage device.

According to the present invention, it is possible to allow the user viewing the color-material saved image output from the image forming unit to recognize that the image is formed under the color-material saving condition using the notification image, and to avoid such a false impression that the image is handled by a low-performance device, from being given to the user.

According to the present invention, when the dedicated output paper is used, the saving process for the color-material consumption is performed. Therefore, the setting can previously be provided so that it is immediately understood from the dedicated paper that the saving process is performed and even if the user fails to perform the saving process, the device can read the information from the dedicated paper to automatically perform the saving process.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an information acquiring unit that acquires information indicating whether a color material used at least for image formation is saved; and
   an image-information generating unit that creates, when the information acquiring unit acquires the information for saving the color material, image information using the color material of which consumption is saved, wherein
   the information acquiring unit is an image-information acquiring unit that acquires image information for an original image and saving-status information indicating whether the color material used for image formation is saved,
   the image-information generating unit is an image-information creating unit that creates image information for color-material saving for saving color material usage, being image formation information for causing an image forming unit that forms an image on a recording material to form the image, when the saving-status information is information for saving the color material, and that creates normal image information when the saving-status information is information for not saving the color material,
   the image-information creating unit creates information, being the image information for color-material saving, to which information for notification image indicating saving condition is added so as to notify that the image is formed under color-material saving condition,
   the image-information acquiring unit is configured so as to acquire saved-amount information indicating how much amount of a color material is saved with respect to an amount of the color material required to form the original image, the image-information creating unit creates information, being the image information for color-material saving, which is image information indicating that the image can be formed by a color-material saved amount indicated by the saved-amount information and which is added with a saved-amount notification image for notifying the saved-amount information, the image information for color-material saving is image information for saving a color material only on a specific type of image in a plurality of types of images contained in the original image, the image-information creating unit determines whether the specific type of image is contained in the original image, and, when the specific type of image is not contained therein, creates information without the information for the notification image, being the image information for color-material saving, even if the saving-status information indicates that the color material is saved, or creates the normal image information being the image formation information, instead of the image information for color-material saving, and the image-information creating unit creates information, being the image information for color-material saving, formed by superimposing the specific type of image and the notification image on each other.

2. The image processing apparatus according to claim 1, wherein the image-information creating unit creates the information for the notification image by adding thereto at least one of a text image, a picture image, and image information for these images at halftone density.

3. The image processing apparatus according to claim 1, wherein the image-information creating unit creates information, being the image information for color-material saving, by adding thereto information formed by superimposing the notification image and a type notification image for notifying the specific type on the specific type of image.

4. The image processing apparatus according to claim 1, wherein the information acquiring unit is a paper-information reading unit that reads information from dedicated output paper added with information for setting a mode of saving color-material consumption, and the image-information generating unit includes
a setting unit that sets an executable saving mode of the color-material consumption based on the saving mode of the color-material consumption specified by the user and also based on the information acquired from the output paper determined by the paper-information reading unit, and an image processing unit that performs image processing according to the saving mode of the color-material consumption set by the setting unit.

5. The image processing apparatus according to claim 4, wherein the image-information generating unit further includes an information inserting unit that inserts information in a predetermined position of the output paper, the information representing that the image processing is performed in the saving mode of the color-material consumption set by the setting unit.

6. An image processing system comprising:

a paper-information reading unit that reads information from dedicated output paper added with information for setting a mode of saving color-material consumption;

a setting unit that sets an executable saving mode of the color-material consumption based on the saving mode of the color-material consumption specified by the user and also based on the information acquired from the output paper determined by the paper-information reading unit; and an image processing unit that performs image processing according to the saving mode of the color-material consumption set by the setting unit.

7. The image processing system according to claim 6, wherein
the mode of saving color-material consumption comprises to output the image for which the number of colors of color materials is reduced.

8. The image processing system according to claim 6, wherein
the information for setting the mode of the saving color-material consumption, which is added to the dedicated output paper, comprises a visible character, design or the combination thereof.

9. The image processing system according to claim 6, wherein
the mode of saving color-material consumption comprises to output the image for which a density of a color material is reduced.

10. The image processing system according to claim 6, further comprising:
an information inserting unit that inserts information in a predetermined position of the output paper, the information representing that the image processing is performed in the saving mode of the color-material consumption set by the setting unit.

11. An image processing method comprising:

information acquiring including acquiring information indicating whether a color material used at least for image formation is saved; and image-information generating including creating, when the information for saving the color material is acquired at the information acquiring, image information using the color material of which consumption is saved, wherein the information acquiring further includes acquiring image information for an original image and saving-status information indicating whether the color material used for image formation is saved, the image-information generating further includes creating image information for color-material saving for saving color material usage, being image formation information for causing an image forming unit that forms an image on a recording material to form the image, when the saving-status information is information for saving the color material, and that creates normal image information when the saving-status information is information for not saving the color material, the creating includes creating information, being the image information for color-material saving, to which information for notification image indicating saving condition is added so as to notify that the image is formed under color-material saving condition, and the image-information creating unit creates information, being the image information for color-material saving, formed by superimposing the specific type of image and the notification image on each other.

12. The image processing method according to claim 11, wherein the information acquiring further includes reading information from dedicated output paper added with information for setting a mode of saving color-material consumption, and the image-information generating further includes
setting an executable saving mode of the color-material consumption based on the saving mode of the color-material consumption specified by the user and also based on the information acquired from the output paper determined at the reading, and performing image processing according to the saving mode of the color-material consumption set at the setting.

* * * * *